(12) United States Patent
Ren et al.

(10) Patent No.: US 11,736,254 B2
(45) Date of Patent: *Aug. 22, 2023

(54) RESOURCE INDICATION METHOD, TERMINAL DEVICE, AND NETWORK DEVICE

(71) Applicant: HUAWEI TECHNOLOGIES CO., LTD., Guangdong (CN)

(72) Inventors: Xiang Ren, Shanghai (CN); Yong Liu, Shanghai (CN); Shibin Ge, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/708,437

(22) Filed: Mar. 30, 2022

(65) Prior Publication Data

US 2022/0224480 A1    Jul. 14, 2022

Related U.S. Application Data

(63) Continuation of application No. 16/557,417, filed on Aug. 30, 2019, now Pat. No. 11,411,696, which is a
(Continued)

(30) Foreign Application Priority Data

Jan. 12, 2018   (CN) .......................... 201810032654.0

(51) Int. Cl.
*H04L 5/00* (2006.01)
*H04W 72/0446* (2023.01)
*H04W 76/27* (2018.01)

(52) U.S. Cl.
CPC ....... *H04L 5/0048* (2013.01); *H04W 72/0446* (2013.01); *H04W 76/27* (2018.02)

(58) Field of Classification Search
CPC ............... H04W 72/042; H04W 28/26; H04W 72/0446; H04W 76/27; H04L 1/0013;
(Continued)

(56) References Cited

U.S. PATENT DOCUMENTS 10,651,999 B2    5/2020  Gao et al.
2014/0286255 A1  9/2014  Nam et al.
(Continued)

FOREIGN PATENT DOCUMENTS

CN    103166880    6/2013
CN    103944665    7/2014
(Continued)

OTHER PUBLICATIONS

Huawei et al., "Design of DL DMRS for data transmission," 3GPP TSG RAN WG1 Meeting #89, R1-1706933, Hangzhou, China, May 15-19, 2017, 6 pages.
(Continued)

*Primary Examiner* — Rushil Parimal Sampat
(74) *Attorney, Agent, or Firm* — Fish & Richardson P.C.

(57) ABSTRACT

This application provides one or more resource indication methods, terminal devices, and network devices. An example method includes: receiving, by the terminal device, the first indication information, and determining time domain positions of a demodulation reference signal (DMRS) based on the mapping type of the physical shared channel and with reference to a position index of the last symbol occupied by the physical shared channel or a quantity of symbols occupied by the physical shared channel in the resource unit. The position index of the last symbol occupied by the physical shared channel in the resource unit corresponds to the first type, and the quantity of symbols occupied by the physical shared channel in the resource unit corresponds to the second type.

38 Claims, 8 Drawing Sheets

Related U.S. Application Data continuation of application No. PCT/CN2018/110919, filed on Oct. 19, 2018.

(58) Field of Classification Search
CPC .......... H04L 25/0226; H04L 27/2607; H04L 5/0007; H04L 5/0044; H04L 5/0048; H04L 5/0051; H04L 5/0053; H04L 5/0057; H04L 5/0091

See application file for complete search history.

(56) References Cited

U.S. PATENT DOCUMENTS

| | | |
|---|---|---|
| 2015/0341931 A1 | 11/2015 | Zhang et al. |
| 2016/0087774 A1 | 3/2016 | Guo et al. |
| 2016/0316459 A1 | 10/2016 | Popovic et al. |
| 2018/0375636 A1* | 12/2018 | You .............. H04W 72/20 |
| 2019/0327055 A1 | 10/2019 | Hao et al. |
| 2019/0342867 A1 | 11/2019 | Lin et al. |
| 2021/0067295 A1 | 3/2021 | Sun et al. |

FOREIGN PATENT DOCUMENTS

| | | |
|---|---|---|
| CN | 104081872 A | 10/2014 |
| CN | 106656448 | 5/2017 |
| CN | 106851827 | 6/2017 |
| CN | 107040354 | 8/2017 |
| CN | 201810019946 | 9/2018 |
| CN | 110022193 | 7/2019 |
| JP | 2019508952 | 3/2019 |
| JP | 2020533856 | 11/2020 |
| JP | 2021502783 | 1/2021 |
| WO | WO2014148318 | 9/2014 |
| WO | 2017110959 A1 | 6/2017 |
| WO | WO2017166902 | 10/2017 |

OTHER PUBLICATIONS

Office Action in Chinese Appln. No. 201810032654.0, dated Feb. 23, 2023, 6 pages.

3GPP TS 38.133 V15.0.0 (Dec. 2017), "3rd Generation Partnership Project; Technical Specification Group Radio Access Network; NR; Requirements for support of radio resource management(Release 15)," Dec. 2017, 41 pages.

3GPP TS 38.211 V1.1.1 (Oct. 2017), "3rd Generation Partnership Project. Technical Specification Group Radio Access Network, NR, Physical channels and modulation (Release 15)," Oct. 2017, 61 pages.

3GPP TS 38.211 V1.3.0 (Dec. 2017), "3rd Generation Partnership Project. Technical Specification Group Radio Access Network, NR, Physical channels and modulation (Release 15)," Dec. 2017, 73 pages.

3GPP TS 38.211 V15.0.0 (Dec. 2017), "3rd Generation Partnership Project, Technical Specification Group Radio Access Network, NR, Physical channels and modulation (Release 15)" Dec. 2017, 73 pages.

3GPP TS 38.212 V15.0.0 (Dec. 2017), "3rd Generation Partnership Project; Technical Specification Group Radio Access Network; NR; Multiplexing and channel coding(Release 15)," Dec. 2017, 82 pages.

3GPP TS 38.213 V15.0.0 (Dec. 2017), "3rd Generation Partnership Project, Technical Specification Group Radio Access Network, NR, Physical layer procedures for control (Release 15)," Dec. 2017, 56 pages.

3GPP TS 38.214 V15.0.0 (Dec. 2017), "3rd Generation Partnership Project, Technical Specification Group Radio Access Network, NR, Physical layer procedures for data (Release 15)," Dec. 2017, 71 pages.

3GPP TS 38.214 V2.0.0 (Dec. 2017), "3rd Generation Partnership Project; Technical Specification Group Radio Access Network; NR; Physical layer procedures for data (Release 15)," Dec. 2017, 71 pages.

3GPP TS 38.300 V15.0.0 (Dec. 2017), "3rd Generation Partnership Project; Technical Specification Group Radio Access Network; NR; NR and NG-RAN Overall Description; Stage 2(Release 15)," Dec. 2017, 68 pages.

3GPP TS 38.331 V15.0.0 (Dec. 2017), "3rd Generation Partnership Project; Technical Specification Group Radio Access Network NR Radio Resource Control (RRC) protocol specification (Release 15)," Dec. 2017, 188 pages.

Ericsson, "Remaining details on DMRS design," 3GPP TSG RAN WG1 Meeting 91, R1-1720736, Reno, USA, Nov. 27-Dec. 1, 2017, 15 pages.

Extended European Search Report issued in European Application No. 18899971.8 dated Apr. 14, 2020, 10 pages.

Huawei et al., "Design of DL DMRS for data transmission," 3GPP TSG RAN WG1 Meeting #90, R1-1712243,Prague, Czech Republic, Aug. 21-25, 2017, 8 pages.

Huawei, HiSilicon, "Correction on additional DMRS location in 38.211," 3GPP TSG RAN WG1 Ad Hoc Meeting, R1-1800907, Vancouver, Canada, Jan. 22-26, 2018, 6 pages.

LG Electronics, "On DMRS design",3GPP TSG RAN WG1 Meeting #91 R1-1719912, Nov. 27-Dec. 1, 2017, 8 pages.

MediaTek Inc., TB size determination and flexible Quantization in NR. 3GPP TSG RAN WG1 #91, Reno, Nevada, USA, Nov. 27-Dec. 1, 2017, R1-1719585, 9 pages.

Office Action issued in Chinese Application No. 201910628734.7 dated Feb. 12, 2020, 6 pages.

Office Action issued in Japanese Application No. 2019-568,016 dated Sep. 23, 2020, 8 pages (With English Translation).

Office Action issued in Japanese Application No. 2021-064441 dated Mar. 22, 2022, 17 pages (with English translation).

Qualcomm Incorporated, "Remaining issues on DMRS design",3GPP TSG RAN WG1 Meeting 91, R1-1720668, Reno, USA, Nov. 27-Dec. 1, 2017, 24 pages.

Qualcomm, Final Issues for Rel-15 PDSCH/PUSCH s DM-RS. 3GPP TSG RAN WG1 Meeting 91, Reno, USA, Nov. 27-Dec. 1, 2017, R1-1721686, 26 pages.

Qualcomm, Further Offline discussion on NR DM-RS. 3GPP TSG RAN WG1 Meeting 91, Reno, USA, Nov. 27-Dec. 1, 2017, R1-1721410, 22 pages.

TSG RAN WG1, "New Radio (NR) Access Technology, Status Report to TSG," 3GPP TSG RAN Meeting #78, RP-172461, Lisbon, Portugal, Dec. 18-21, 2017, 140 pages.

ZTE et al., "Remaining details on DL DMRS and UL DMRS," 3GPP TSG HAN WG1 Meeting 90bis, R1-1717433, Prague, CZ, Oct. 9-13, 2017, 8 pages.

* cited by examiner

RESOURCE INDICATION METHOD, TERMINAL DEVICE, AND NETWORK DEVICE

CROSS-REFERENCE TO RELATED APPLICATIONS

This application is a continuation of U.S. patent application Ser. No. 16/557,417, filed on Aug. 30, 2019, now issued as U.S. Pat. No. 11,411,696 dated Aug. 9, 2022 which is a continuation of International Application No. PCT/CN2018/110919, filed on Oct. 19, 2018. The International Application claims priority to Chinese Patent Application No. 201810032654.0, filed on Jan. 12, 2018. All of the aforementioned patent applications are hereby incorporated by reference in their entireties.

TECHNICAL FIELD

This application relates to the communications field, and in particular, to a resource indication method, a terminal device, and a network device in the communications field.

BACKGROUND

With development of communications technologies, in new radio (NR), demodulation reference signals (DMRS) may include a first DMRS (also referred to as a front-loaded DMRS) and an additional DMRS. A time domain position of the additional DMRS is after a time domain position of the first DMRS. NR may support additional DMRSs whose density is configurable. For example, a quantity of additional DMRSs is configured to 0, 1, 2, or 3. In addition, for each time domain density, NR supports a plurality of positions of the additional DMRS, and a specific position needs to be determined based on a system parameter. In addition, NR may further support two types of physical shared channel mapping manners, namely, a first type and a second type, also referred to as a PDSCH mapping type A and a PDSCH mapping type B, or a PUSCH mapping type A and a PUSCH mapping type B.

In an existing method, for both the mapping type A and the mapping type B, the additional DMRS is determined by using a total quantity of symbols (also referred to as duration) occupied by a physical uplink shared channel (PUSCH) or a physical downlink shared channel (PDSCH) in a resource unit. Specifically, for an additional DMRS in uplink DMRSs, different time domain positions of the additional DMRS are selected based on the duration of the PUSCH. For an additional DMRS in downlink DMRSs, different time domain positions of the additional DMRS are selected based on the duration of the PDSCH.

An error may occur in a current design for the mapping type A, and a network device cannot correctly indicate a same quantity of additional DMRSs that is supported in the mapping type A. To be specific, in a case of same PDSCH duration or same PUSCH duration, an additional DMRS occupies different time domain positions in a resource unit. For example, when the PUSCH duration is seven symbols, whether the additional DMRS is configured on the eighth or the tenth symbol in the resource unit cannot be distinguished. Consequently, a terminal device cannot determine a time domain position occupied by a DMRS in a resource unit, affecting communication between the network device and the terminal device.

SUMMARY

This application provides a resource indication method, a terminal device, and a network device, to help a terminal device accurately determine a time domain position of a DMRS.

According to a first aspect, a resource indication method is provided. The resource indication method includes: receiving, by a terminal device, first indication information sent by a network device, where the first indication information is used to indicate a mapping type of a physical shared channel, and the mapping type of the physical shared channel is a first type or a second type; and determining, by the terminal device, time domain positions occupied by the DMRSs in a resource unit based on the mapping type of the physical shared channel and with reference to a position index of the last symbol occupied by the physical shared channel in the resource unit or a quantity of symbols occupied by the physical shared channel in the resource unit, where the position index of the last symbol occupied by the physical shared channel in the resource unit corresponds to the first type, and the quantity of symbols occupied by the physical shared channel in the resource unit corresponds to the second type.

According to the resource indication method in this embodiment of this application, different mapping types of the physical shared channel are configured to correspond to different parameters, and the network device sends, to the terminal device, the indication information used to indicate the mapping type of the physical shared channel, so that the terminal device can select a corresponding parameter based on the mapping type of the physical shared channel, to help the terminal device accurately determine the time domain positions occupied by DMRSs in the resource unit, thereby improving performance of data transmission between the network device and the terminal device.

It should be understood that, the first type corresponds to the position index of the last symbol occupied by the physical shared channel in the resource unit, and the second type corresponds to the quantity of symbols occupied by the physical shared channel in the resource unit. This correspondence may be predefined in a protocol, or may be configured by the network device for the terminal device by using signaling. This is not limited in this embodiment of this application.

In a possible implementation, both the network device and the terminal device store DMRS configuration information, and the DMRS configuration information includes time domain positions of the DMRSs in different mapping types of the physical shared channel. The network device configures the time domain positions of the DMRSs for the terminal device based on the DMRS configuration information, and notifies the terminal device by using the first indication information. The terminal device receives the first indication information, selects information corresponding to the mapping type of the physical shared channel from the DMRS configuration information based on the mapping type that is of the physical shared channel and that is indicated by the first indication information, and determines the time domain positions of the DMRSs in the resource unit with reference to the parameter corresponding to the mapping type of the physical shared channel.

With reference to the first aspect, in some implementations of the first aspect, the DMRSs include a first DMRS and an additional DMRS; and the determining time domain positions occupied by DMRSs in a resource unit includes: determining, by the terminal device, a time domain position occupied by the additional DMRS in the resource unit based on the mapping type of the physical shared channel and with reference to the position index of the last symbol occupied by the physical shared channel in the resource unit or the quantity of symbols occupied by the physical shared channel in the resource unit.

Specifically, the DMRSs may include the first DMRS (namely, a front-loaded DMRS) and the additional DMRS. A time domain position of the first DMRS is decoupled from the time domain position of the additional DMRS, and there is no association relationship between the time domain position of the first DMRS and the time domain position of the additional DMRS. The time domain position of the first DMRS may be predefined in a protocol, or may be configured by the network device for the terminal device by using signaling. This is not limited in this embodiment of this application. Therefore, in this embodiment of this application, the terminal device only needs to determine the time domain position of the additional DMRS based on the mapping type of the physical shared channel and with reference to the parameter (the position index of the last symbol occupied by the physical shared channel in the resource unit or the quantity of symbols occupied by the physical shared channel in the resource unit) corresponding to the mapping type of the physical shared channel. After the time domain position of the additional DMRS is determined, the terminal device may determine the time domain positions of the DMRSs with reference to the time domain position of the first DMRS and the time domain position of the additional DMRS.

With reference to the first aspect, in some implementations of the first aspect, the mapping type of the physical shared channel is the first type; and the determining a time domain position occupied by the additional DMRS in the resource unit includes: determining, by the terminal device, the time domain position occupied by the additional DMRS in the resource unit based on at least the position index of the last symbol occupied by the physical shared channel in the resource unit and a first mapping relationship, where the first mapping relationship is used to indicate a correspondence between different position indexes of the last symbols of physical shared channels in the resource unit and different time domain positions occupied by additional DMRSs in the resource unit.

It should be understood that, different additional DMRSs may be used to indicate different quantities of additional DMRSs, where for example, the quantity of additional DMRSs is 0, 1, 2, or 3; or may be used to indicate DMRSs having different actual quantities of symbols, where for example, the actual quantity of symbols of the DMRS is one symbol or two symbols; or may be used to indicate additional DMRSs in different positions. This is not limited in this embodiment of this application.

It should be further understood that, the first mapping relationship may be implemented by using a formula, a table, or another manner, and may be specifically used to indicate the correspondence between the different position indexes and the different time domain positions. In a possible implementation, the first mapping relationship is included in the DMRS configuration information. The terminal device may select the first mapping relationship from the DMRS configuration information based on the mapping type of the physical shared channel, namely, the first type, and select the time domain position occupied by the additional DMRS in the resource unit from the first mapping relationship with reference to the position index of the last symbol occupied by the physical shared channel in the resource unit. However, this is not limited in this embodiment of this application.

With reference to the first aspect, in some implementations of the first aspect, the mapping type of the physical shared channel is the second type; and the determining a time domain position occupied by the additional DMRS in the resource unit includes: determining, by the terminal device, the time domain position occupied by the additional DMRS in the resource unit based on at least the quantity of symbols occupied by the physical shared channel in the resource unit and a second mapping relationship, where the second mapping relationship is used to indicate a correspondence between different quantities of symbols occupied by physical shared channels in the resource unit and different time domain positions occupied by additional DMRSs in the resource unit.

It should be understood that, the second mapping relationship may be implemented by using a formula, a table, or another manner, and may be specifically used to indicate the correspondence between the different quantities of symbols and the different time domain positions. In a possible implementation, the second mapping relationship is included in the DMRS configuration information. The terminal device may select the second mapping relationship from the DMRS configuration information based on the mapping type of the physical shared channel, namely, the second type, and select the time domain position occupied by the additional DMRS in the resource unit from the second mapping relationship with reference to the quantity of symbols occupied by the physical shared channel in the resource unit. However, this is not limited in this embodiment of this application.

With reference to the first aspect, in some implementations of the first aspect, before the determining a time domain position occupied by the additional DMRS in the resource unit, the method further includes: receiving, by the terminal device, second indication information sent by the network device, where the second indication information is used to indicate a quantity of additional DMRSs; and receiving, by the terminal device, third indication information sent by the network device, where the third indication information is used to indicate an actual quantity of symbols occupied by the first DMRS in the resource unit; and the determining a time domain position occupied by the additional DMRS in the resource unit includes: determining, by the terminal device, the time domain position occupied by the additional DMRS in the resource unit based on the mapping type of the physical shared channel, the quantity of additional DMRSs, and the actual quantity of symbols occupied by the first DMRS in the resource unit and with reference to the position index of the last symbol occupied by the physical shared channel in the resource unit or the quantity of symbols occupied by the physical shared channel in the resource unit.

It should be understood that, the quantity of additional DMRSs may be 0, 1, 2, or 3, and the actual quantity of symbols occupied by the first DMRS in the resource unit may be 1 or 2. For different cases, the network device may configure different resource mapping manners for the terminal device. Therefore, there is also a correspondence between the time domain position occupied by the additional DMRS in the resource unit and parameters such as the quantity of additional DMRSs and the actual quantity of symbols occupied by the first DMRS in the resource unit. In a possible implementation, the DMRS configuration information may include a correspondence between different mapping types of physical shared channels, different quantities of additional DMRSs, different actual quantities of symbols occupied by the first DMRSs in the resource unit, and different time domain positions. However, this is not limited in this embodiment of this application.

It should be further understood that the second indication information may be carried in radio resource control (RRC) signaling. The third indication information may be indicated by using one piece of signaling or may be jointly indicated by using a plurality of pieces of signaling. This is not limited in this embodiment of this application. For example, the network device may first indicate, to the terminal device by using RRC signaling, a maximum quantity of symbols occupied by the first DMRS in the resource unit. If the maximum quantity of symbols is 1, the actual quantity of symbols occupied by the first DMRS in the resource unit is inevitably 1 and does not need to be further indicated. If the maximum quantity of symbols is 2, the actual quantity of symbols occupied by the first DMRS in the resource unit may be 1 or 2, and the network device needs to further indicate, to the terminal device by using downlink control information (DCI), the actual quantity of symbols occupied by the first DMRS in the resource unit.

In another implementation of the first aspect, a resource configuration method is provided. The resource configuration method includes: receiving demodulation reference signal (DMRS) configuration information, where the DMRS configuration information includes time domain positions of DMRSs in different mapping types of the DMRSs, a mapping type of the physical shared channel is a first type or a second type, DMRS configuration information corresponding to the first type includes a position index of the last symbol occupied by the physical shared channel in a resource unit, and DMRS configuration information corresponding to the second type includes a quantity of symbols occupied by the physical shared channel in the resource unit; and storing the DMRS configuration information.

It should be understood that, the DMRS configuration information may be implemented by using a formula, a table, or another manner. Both the network device and the terminal device may store the DMRS configuration information, to subsequently configure the time domain positions of the DMRSs based on the DMRS configuration information.

According to a second aspect, another resource indication method is provided. The resource indication method includes: determining, by a network device, first indication information, where the first indication information is used to indicate a mapping type of a physical shared channel of demodulation reference signals, and the mapping type of the physical shared channel is a first type or a second type; and sending, by the network device, the first indication information to a terminal device, where a position index of the last symbol occupied by the physical shared channel in a resource unit corresponds to the first type, and a quantity of symbols occupied by the physical shared channel in the resource unit corresponds to the second type.

With reference to the second aspect, in some implementations of the second aspect, the DMRSs include a first DMRS and an additional DMRS, and the method further includes: sending, by the network device, second indication information to the terminal device, where the second indication information is used to indicate a quantity of additional DMRSs; and sending, by the network device, third indication information to the terminal device, where the third indication information is used to indicate an actual quantity of symbols occupied by the first DMRS in the resource unit.

In another implementation of the second aspect, a resource configuration method is provided. The resource configuration method includes: receiving demodulation reference signal (DMRS) configuration information, where the DMRS configuration information includes time domain positions of DMRSs in different mapping types of the DMRSs, a mapping type of the physical shared channel is a first type or a second type, DMRS configuration information corresponding to the first type includes a position index of the last symbol occupied by the physical shared channel in a resource unit, and DMRS configuration information corresponding to the second type includes a quantity of symbols occupied by the physical shared channel in the resource unit; and storing the DMRS configuration information.

According to a third aspect, another resource indication method is provided. The resource indication method includes: receiving, by a terminal device, fourth indication information sent by a network device, where the fourth indication information is used to indicate a mapping type of a physical shared channel of demodulation reference signals and a quantity of symbols occupied by the physical shared channel in a resource unit, and the mapping type of the physical shared channel is a first type or a second type; and determining, by the terminal device, a time domain position occupied by an additional DMRS in the DMRSs in the resource unit based on the mapping type of the physical shared channel, the quantity of symbols occupied by the physical shared channel in the resource unit, and a time domain position occupied by a first DMRS in the DMRSs in the resource unit.

According to the resource indication method in this embodiment of this application, the terminal device determines the time domain position of the additional DMRS based on the indication information that is sent by the network device and that is used to indicate the mapping type of the physical shared channel and the quantity of symbols occupied by the physical shared channel in the resource unit and with reference to the time domain position of the first DMRS, to help accurately determine time domain positions occupied by DMRSs in the resource unit, thereby improving performance of data transmission between the network device and the terminal device.

In a possible implementation, both the network device and the terminal device store DMRS configuration information, and the DMRS configuration information includes time domain positions of the DMRSs in different mapping types of the physical shared channel. The network device configures the time domain positions of the DMRSs for the terminal device based on the DMRS configuration information, and notifies the terminal device by using the fourth indication information. The terminal device receives the fourth indication information, and determines the time domain positions of the DMRSs in the resource unit based on the mapping type of the physical shared channel and duration of the physical shared channel that are indicated by the fourth indication information and with reference to the time domain position of the first DMRS.

With reference to the third aspect, in some implementations of the third aspect, before the determining a time domain position occupied by an additional DMRS in the DMRSs in the resource unit, the method further includes: receiving, by the terminal device, fifth indication information sent by the network device, where the fifth indication information is used to indicate the time domain position occupied by the first DMRS in the resource unit.

With reference to the third aspect, in some implementations of the third aspect, the mapping type of the physical shared channel is the first type; and the determining a time domain position occupied by an additional DMRS in the DMRSs in the resource unit includes: determining, by the terminal device, the time domain position occupied by the additional DMRS in the resource unit based on the quantity of symbols occupied by the physical shared channel in the resource unit, the time domain position occupied by the first DMRS in the resource unit, and a third mapping relationship, where the third mapping relationship is used to indicate a correspondence between different quantities of symbols occupied by physical shared channels in the resource unit, different time domain positions occupied by the first DMRSs in the resource unit, and different time domain positions occupied by additional DMRSs in the resource unit.

With reference to the third aspect, in some implementations of the third aspect, the mapping type of the physical shared channel is the second type; and the determining a time domain position occupied by an additional DMRS in the DMRSs in the resource unit includes: determining, by the terminal device, the time domain position occupied by the additional DMRS in the resource unit based on the quantity of symbols occupied by the physical shared channel in the resource unit, the time domain position occupied by the first DMRS in the resource unit, and a fourth mapping relationship, where the fourth mapping relationship is used to indicate a correspondence between different quantities of symbols occupied by physical shared channels in the resource unit, different time domain positions occupied by the first DMRSs in the resource unit, and different time domain positions occupied by additional DMRSs in the resource unit.

With reference to the third aspect, in some implementations of the third aspect, before the determining a time domain position occupied by an additional DMRS in the DMRSs in the resource unit, the method further includes: receiving, by the terminal device, sixth indication information sent by the network device, where the sixth indication information is used to indicate a quantity of additional DMRSs; and receiving, by the terminal device, seventh indication information sent by the network device, where the seventh indication information is used to indicate an actual quantity of symbols occupied by the first DMRS in the resource unit; and the determining a time domain position occupied by an additional DMRS in the DMRSs in the resource unit includes: determining, by the terminal device, the time domain position occupied by the additional DMRS in the resource unit based on the mapping type of the physical shared channel, the quantity of symbols occupied by the physical shared channel in the resource unit, the time domain position occupied by the first DMRS in the resource unit, the quantity of additional DMRSs, and the actual quantity of symbols occupied by the first DMRS in the resource unit.

In another implementation of the third aspect, a resource configuration method is provided. The resource configuration method includes: receiving demodulation reference signal (DMRS) configuration information, where DMRSs include a first DMRS and an additional DMRS, the DMRS configuration information includes time domain positions that are of additional DMRSs and that correspond to different time domain positions of the first DMRSs in different mapping types of a physical shared channel, and the mapping types of the physical shared channel include a first type and a second type; and storing the DMRS configuration information.

According to a fourth aspect, a terminal device is provided. The terminal device is configured to perform the method according to any one of the first aspect or the possible implementations of the first aspect. Specifically, the terminal device includes a unit configured to perform the method according to any one of the first aspect or the possible implementations of the first aspect.

According to a fifth aspect, a network device is provided. The network device is configured to perform the method according to any one of the second aspect or the possible implementations of the second aspect. Specifically, the network device includes a unit configured to perform the method according to any one of the second aspect or the possible implementations of the second aspect.

According to a sixth aspect, a terminal device is provided. The terminal device is configured to perform the method according to any one of the third aspect or the possible implementations of the third aspect. Specifically, the terminal device includes a unit configured to perform the method according to any one of the third aspect or the possible implementations of the third aspect.

According to a seventh aspect, another terminal device is provided. The terminal device includes: a transceiver, a memory, and a processor. The transceiver, the memory, and the processor communicate with one another through an internal connection path. The memory is configured to store an instruction. The processor is configured to execute the instruction stored in the memory, to control the transceiver to receive and send signals. In addition, when the processor executes the instruction stored in the memory, the processor is enabled to perform the method according to any one of the first aspect or the possible implementations of the first aspect.

According to an eighth aspect, another network device is provided. The network device includes: a transceiver, a memory, and a processor. The transceiver, the memory, and the processor communicate with one another through an internal connection path. The memory is configured to store an instruction. The processor is configured to execute the instruction stored in the memory, to control a receiver to receive a signal and control a transmitter to send a signal. In addition, when the processor executes the instruction stored in the memory, the processor is enabled to perform the method according to any one of the second aspect or the possible implementations of the second aspect.

According to a ninth aspect, another terminal device is provided. The terminal device includes: a transceiver, a memory, and a processor. The transceiver, the memory, and the processor communicate with one another through an internal connection path. The memory is configured to store an instruction. The processor is configured to execute the instruction stored in the memory, to control a receiver to receive a signal and control a transmitter to send a signal. In addition, when the processor executes the instruction stored in the memory, the processor is enabled to perform the method according to any one of the third aspect or the possible implementations of the third aspect.

According to a tenth aspect, a computer program product is provided. The computer program product includes computer program code, and when the computer program code is run by a computer, the computer is enabled to perform the method according to any one of the first aspect or the possible implementations of the first aspect.

According to an eleventh aspect, a computer program product is provided. The computer program product includes computer program code, and when the computer program code is run by a computer, the computer is enabled to perform the method according to any one of the second aspect or the possible implementations of the second aspect.

According to a twelfth aspect, a computer program product is provided. The computer program product includes computer program code, and when the computer program code is run by a computer, the computer is enabled to perform the method according to any one of the third aspect or the possible implementations of the third aspect.

According to a thirteenth aspect, a computer-readable medium is provided. The computer-readable medium is configured to store a computer program. The computer program includes an instruction used to perform the method according to any one of the first aspect or the possible implementations of the first aspect.

According to a fourteenth aspect, a computer-readable medium is provided. The computer-readable medium is configured to store a computer program. The computer program includes an instruction used to perform the method according to any one of the second aspect or the possible implementations of the second aspect.

According to a fifteenth aspect, a computer readable medium is provided. The computer-readable medium is configured to store a computer program. The computer program includes an instruction used to perform the method according to any one of the third aspect or the possible implementations of the third aspect.

According to a sixteenth aspect, a chip is provided. The chip includes a processor, configured to read an instruction stored in a memory, to perform any one of the foregoing methods. Steps related to transmission and receiving should be understood as being performed by the processor by using a transceiver.

DESCRIPTION OF EMBODIMENTS

Figure 1:
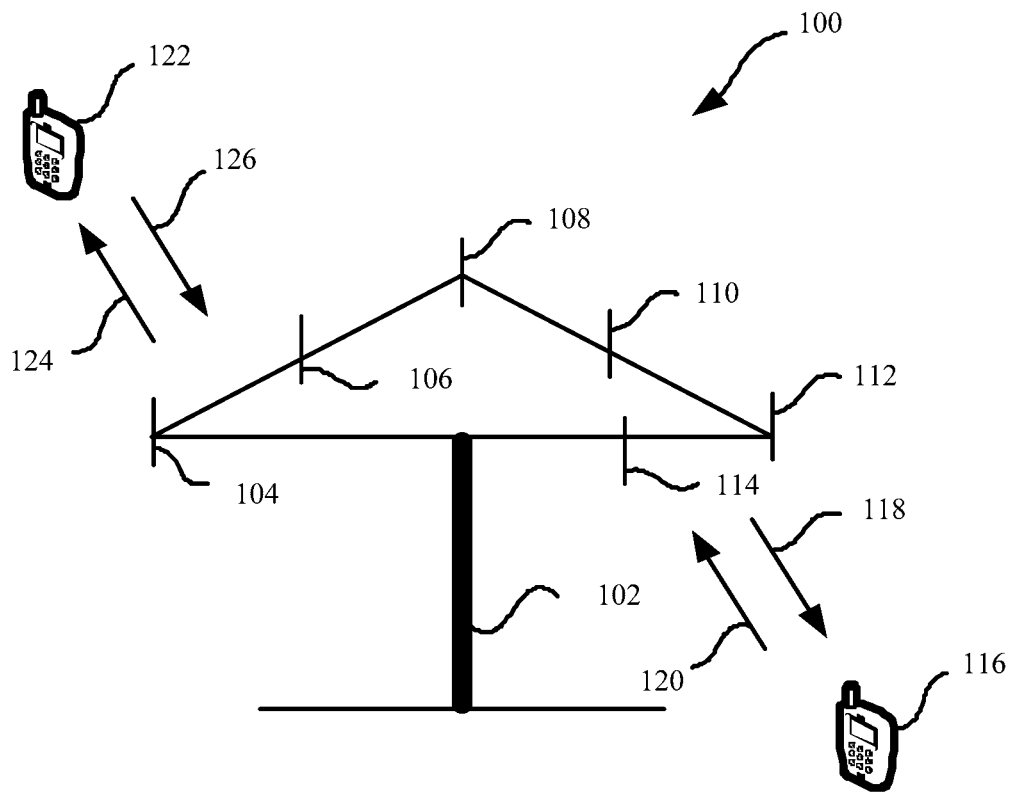
FIG. 1 is a schematic diagram of a communications system according to an embodiment of this application.

The following describes technical solutions in this application with reference to accompanying drawings.

It should be understood that the technical solutions in the embodiments of this application may be applied to various communications systems, such as: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) system, a worldwide interoperability for microwave access (WiMAX) communications system, a future 5th-generation (5th generation, 5G) system, or a new radio (NR) system.

It should be further understood that, the technical solutions in the embodiments of this application may further be applied to various communications systems based on non-orthogonal multiple access technologies, for example, a sparse code multiple access (SCMA) system. Certainly, SCMA may also be referred to as another name in the communications field. Further, the technical solutions in the embodiments of this application may be applied to multi-carrier transmission systems using the non-orthogonal multiple access technologies, for example, systems using non-orthogonal multiple access technologies of orthogonal frequency division multiplexing (OFDM), filter bank multicarrier (filter bank multi carrier, FBMC), generalized frequency division multiplexing (GFDM), and filtered-orthogonal frequency division multiplexing (filtered-OFDM, F-OFDM).

It should also be understood that, a terminal device in the embodiments of this application may communicate with one or more core networks by using a radio access network (RAN), and the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like.

It should be further understood that, in the embodiments of this application, a network device may be configured to communicate with the terminal device. The network device may be a base transceiver station (BTS) in a GSM system or a CDMA system, or may be a NodeB (Node B, NB) in a WCDMA system, or may be an evolved NodeB (evolutional Node B, eNB or eNode B) in an LTE system. Alternatively, the network device may be a relay station, an access point, an in-vehicle device, a wearable device, a network side device in a future 5G network, or a network device in a future evolved PLMN.

The embodiments of this application may be applied to the LTE system and a subsequent evolved system such as 5G system, or other wireless communications systems using various radio access technologies, for example, systems using access technologies such as code division multiple access, frequency division multiple access, time division multiple access, orthogonal frequency division multiple access, and single-carrier frequency division multiple access; and are particular applicable to scenarios in which channel information feedback is required and/or a secondlevel precoding technology is applied, for example, a wireless network applying a massive MIMO technology and a wireless network applying a distributed antenna technology.

It should be understood that, a multiple-input multiple-output (MIMO) technology means that a plurality of transmit antennas and a plurality of receive antennas are respectively used for a transmit end device and a receive end device, so that a signal is transmitted and received by using the plurality of antennas of the transmit end device and the receive end device, thereby improving communication quality. According to the multiple-input multiple-output technology, a spatial resource can be fully used; and multiple-input multiple-output is implemented by using the plurality of antennas, so that a system channel capacity can be multiplied without an increase in a spectrum resource and antenna transmit power.

MIMO may be classified into single-user multiple-input multiple-output (single-user MIMO, SU-MIMO) and multi-user multiple-input multiple-output (multi-user MIMO, MU-MIMO). For the massive MIMO, hundreds of antennas are arranged on the transmit end device according to a multi-user beamforming principle, to modulate respective beams for dozens of target receivers, and simultaneously transmit dozens of signals on a same frequency resource through spatial signal isolation. Therefore, according to the massive MIMO technology, spatial degree of freedom caused by a scaled antenna configuration can be fully used, thereby improving spectral efficiency.

FIG. 1 is a schematic diagram of a communications system 100 used in an embodiment of this application. As shown in FIG. 1, the communications system 100 includes a network device 102, and the network device 102 may include a plurality of antenna groups. Each antenna group may include one or more antennas. For example, one antenna group may include antennas 104 and 106, another antenna group may include antennas 108 and 110, and an additional group may include antennas 112 and 114. For each antenna group, two antennas are shown in FIG. 1. However, more or fewer antennas may be used for each group. The network device 102 may additionally include a transmitter chain and a receiver chain. A person of ordinary skill in the art may understand that the transmitter chain and the receiver chain may both include a plurality of components related to signal sending and receiving, for example, a processor, a modulator, a multiplexer, a demodulator, a demultiplexer, or an antenna.

The network device 102 may communicate with a plurality of terminal devices. For example, the network device 102 may communicate with a terminal device 116 and a terminal device 122. However, it may be understood that the network device 102 may communicate with any quantity of terminal devices similar to the terminal device 116 or 122. The terminal devices 116 and 122 may be, for example, a cellular phone, a smartphone, a portable computer, a handheld communications device, a handheld computing device, a satellite radio apparatus, a global positioning system, a PDA, and/or any other suitable devices used for communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a frequency band different from that used by the reverse link 120; the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each group of antennas and/or an area that is designed for communication is referred to as a sector of the network device 102. For example, an antenna group may be designed to communicate with a terminal device in the sector within coverage of the network device 102. In a process in which the network device 102 communicates with the terminal devices 116 and 122 by respectively using the forward links 118 and 124, a transmit antenna of the network device 102 may improve signal-to-noise ratios of the forward links 118 and 124 through beamforming. In addition, compared with a manner in which the network device sends, by using a single antenna, signals to all terminal devices served by the network device, when the network device 102 sends, through beamforming, signals to the terminal devices 116 and 122 that are randomly distributed within the related coverage, less interference is caused to a mobile device in a neighboring cell.

In a given time, the network device 102 and the terminal device 116 or the terminal device 122 may be a sending apparatus for wireless communication and/or a receiving apparatus for wireless communication. When sending data, the sending apparatus for wireless communication may encode the data for transmission. Specifically, the sending apparatus for wireless communication may obtain a particular quantity of data bits to be sent to the receiving apparatus for wireless communication over a channel. For example, the sending apparatus for wireless communication may generate, receive from another communications apparatus, or store in a memory, the particular quantity of data bits to be sent to the receiving apparatus for wireless communication over the channel. Such data bits may be included in a transport block or a plurality of transport blocks of the data, and the transport block may be segmented to generate a plurality of code blocks.

In addition, the communications system 100 may be a public land mobile network (PLMN), a device-to-device (D2D) network, a machine-to-machine (M2M) network, or another network. FIG. 1 is merely a simplified schematic diagram used as an example for ease of understanding. The network may further include another network device, not shown in FIG. 1.

For ease of understanding, related terms in this specification are first described briefly.

Resource unit: similar to an RB and an RB pair in an LTE standard. The resource unit may be used as a basic unit by a scheduling terminal for resource allocation, or may be used to describe an arrangement manner of a plurality of reference signals.

The resource unit may include a plurality of subcarriers consecutive in frequency domain and one time interval (TI) in time domain. In different scheduling processes, the resource unit may have a same size or different sizes. The TI herein may be a transmission time interval (TTI) in an LTE system, a symbol-level short TTI, a short TTI of a large subcarrier spacing in a high-frequency system, a slot or a mini-slot in a 5G system, or the like. This is not limited in this application.

Figure 2:
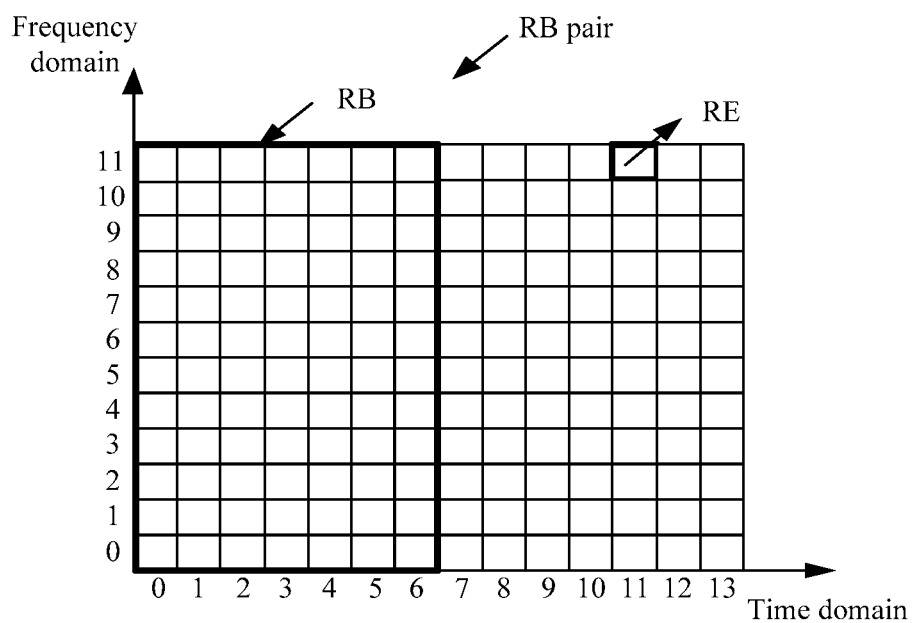
FIG. 2 is a schematic diagram of a resource unit according to an embodiment of this application.

Optionally, one resource unit may include one or more RBs, one or more RB pairs, or the like; or may be half an RB or the like. In addition, the resource unit may alternatively be another time-frequency resource. This is not limited in this application. One RB pair includes 12 consecutive subcarriers in frequency domain and one subframe in time domain. A time-frequency resource including one subcarrier in frequency domain and one symbol in time domain is one resource element (RE), as shown in FIG. 2. An RB pair in FIG. 2 includes 12 consecutive subcarriers (numbered from 0 to 11) in frequency domain and 14 symbols (numbered 0 to 13) in time domain. In FIG. 2, a horizontal coordinate indicates the time domain, and a vertical coordinate indicates the frequency domain. It should be noted that, "include" in this application indicates that accompanying drawings of a time domain resource are all described based on an example of the RB pair shown in FIG. 2. A person skilled in the art may understand that in a specific implementation, this application is not limited thereto.

It should be understood that a "symbol" in this application may include, but is not limited to, any one of the following: an orthogonal frequency division multiplexing (OFDM) symbol, a universal filtered multi-carrier (UFMC) symbol, a filter bank multicarrier (FBMC) symbol, a generalized frequency-division multiplexing (GFDM) symbol, and the like.

DMRS component pattern: a DMRS pattern that can support a maximum quantity of ports on a specific quantity of consecutive symbols in one resource unit in time domain. It should be noted that, a specific symbol position of the DMRS component pattern is not limited herein. For example, the DMRS component pattern may be placed in front, or may be placed behind. A specific quantity of symbols of the DMRS component pattern is also not limited. For example, the DMRS component pattern may occupy one symbol in time domain, or may occupy two symbols in time domain. In addition, a port multiplexing manner in the DMRS component pattern is not limited.

DMRS pattern: including a time-frequency mapping resource of a DMRS in one resource unit. The DMRS pattern includes at least one DMRS component pattern. For example, one DMRS pattern may include only one DMRS component pattern, or may include a plurality of same DMRS component patterns, or may include a plurality of different DMRS component patterns. This is not limited in the embodiments of this application.

The DMRS component pattern may be classified into the following two different types based on a time domain position of the DMRS component pattern in the resource unit.

1. First DMRS, also referred to as a front-loaded DMRS: occupying at least one consecutive symbol in the resource unit. A position index of the first symbol in the at least one symbol is a minimum value of a symbol index occupied by the DMRS pattern in the resource unit.

2. Additional DMRS: occupying at least one symbol after the symbol occupied by the first DMRS in the resource unit. The last symbol in the at least one symbol occupied by the first DMRS is not consecutive to the first symbol in the at least one symbol occupied by the additional DMRS. In other words, a symbol used for data transmission exists between the additional DMRS and the first DMRS.

For ease of understanding, several points are first described below.

First, in this application, for ease of description, symbols included in one resource unit in time domain are continuously numbered by starting from 0, and subcarriers included in one resource unit in frequency domain are numbered by starting from 0. For example, using an example in which one resource unit is one RB pair, the RB pair may include symbols 0 to 13 in time domain, and may include subcarriers 0 to 11 in frequency domain. Certainly, in a specific implementation, this application is not limited thereto. For example, one resource unit may include symbols 1 to 14 in time domain, and may include subcarriers 1 to 12 in frequency domain. It should be noted that, the foregoing descriptions are set for ease of describing the technical solutions provided in the embodiments of this application instead of limiting the scope of this application.

Second, the DMRS may be mapped to at least one symbol in the resource unit. Optionally, the at least one symbol may be a front symbol or a rear symbol in the resource unit. The front symbol is a symbol in a front position in a resource unit, for example, may correspond to a symbol before a symbol numbered 7 (namely, the seventh symbol) in FIG. 2 or the seventh symbol. For which symbols the front symbol is specifically defined as, this is not limited in this application. Alternatively, the at least one symbol maybe the rear symbol. The rear symbol is a symbol after the symbol numbered 7 in FIG. 2. For which symbols the rear symbol is specifically defined as, this is not limited in this application. It may be understood that, in an actual implementation, if the DMRS is mapped to a plurality of symbols, the plurality of symbols may be symbols of a same type or may be symbols of different types. The type includes the front symbol and the rear symbol. For example, the plurality of symbols are all front symbols; or some of the plurality of symbols are front symbols, and the other symbols are rear symbols.

In addition, in this embodiment of this application, if DMRSs are mapped to a plurality of symbols, the plurality of symbols may be consecutive or may be discrete. In other words, the plurality of symbols may be neighboring symbols or may be non-neighboring symbols. It may be understood that, in this application, some or all of the DMRSs may be mapped to the front symbols. In this way, a receiving device can more quickly complete receiving the DMRSs, to start data demodulation, and satisfy a requirement for quick data demodulation in NR.

Third, several mapping rules between a DMRS and a time domain resource are schematically described in this application, and may be specifically presented by using a DMRS pattern. In a specific implementation process, the foregoing mapping rule may be implemented by using a formula, a table, or another manner. In a specific implementation process, the terminal device may learn of, according to a rule agreed with the network device or information used to indicate a time-frequency resource corresponding to a DMRS, the time-frequency resource corresponding to the DMRS. For example, the network device may configure, for the terminal device by using radio resource control (RRC) signaling, a pattern of a DMRS located on a front symbol, and additionally configure, by using downlink control information (DCI), a position of a DMRS located on a rear symbol. The network device may further indicate a quantity of DMRSs by using indication information, and the terminal device selects a DMRS pattern corresponding to the quantity of DMRSs. In addition, the network device may alternatively directly configure a DMRS pattern by using RRC signaling. This is not limited in this application. How the terminal device obtains the DMRS from the time-frequency resource may be implemented by using a method in the prior art.

In a possible implementation, a mapping type of a physical shared channel may include a first type and a second type, respectively referred to as a PDSCH (or PUSCH) mapping type A and a PDSCH (or PUSCH) mapping type B. The mapping type A and the mapping type B correspond to different resource mapping manners.

For the mapping type A, time domain positions of DMRSs are defined relative to a start position of a slot, and a position $l_0$ of the first DMRS symbol (namely, the first symbol position of a front-loaded DMRS) may be configured as the third symbol or the fourth symbol in the slot, in other words, $l_0=2$ or 3.

For the mapping type B, time domain positions of DMRSs are determined relative to a start position of a resource of a scheduled PUSCH or PDSCH, and a position $l_0$ of the first DMRS symbol (namely, the first symbol position of a front-loaded DMRS) is the first symbol of the scheduled PUSCH or PDSCH, in other words, $l_0=0$.

It should be understood that, the technical solutions provided in this application may be applied to a single-carrier transmission scenario or a multi-carrier transmission scenario; or may be applied to an uplink transmission scenario or a downlink transmission scenario. In addition, the technical solutions provided in this application may be applied to a broadcast/multicast physical downlink shared channel (broadcast/multicast PDSCH), a physical broadcast channel (PBCH), or the like. This is not limited in the embodiments of this application.

Figure 3:
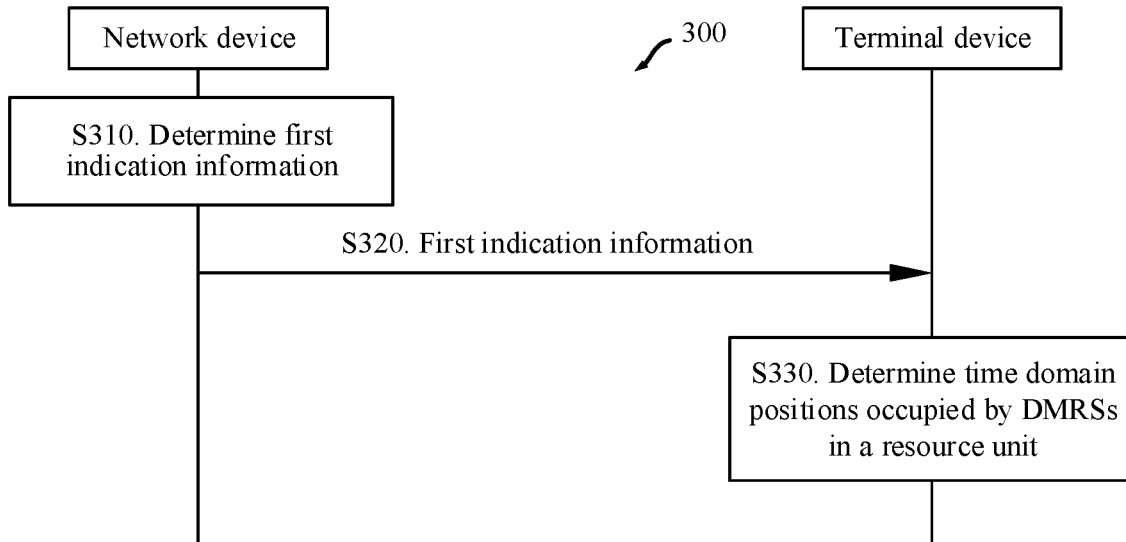
FIG. 3 is a schematic flowchart of a resource indication method according to an embodiment of this application.

FIG. 3 is a schematic flowchart of a resource indication method 300 according to an embodiment of this application. The method 300 may be applied to the communications system 100 shown in FIG. 1, but this embodiment of this application is not limited thereto.

S310. A network device determines first indication information, where the first indication information is used to indicate a mapping type of a physical shared channel of demodulation reference signals, and the mapping type of the physical shared channel is a first type or a second type.

S320. The network device sends the first indication information to a terminal device, and correspondingly, the terminal device receives the first indication information sent by the network device.

S330. The terminal device determines time domain positions occupied by the DMRSs in a resource unit based on the mapping type of the physical shared channel and with reference to a position index of the last symbol occupied by the physical shared channel in the resource unit or a quantity of symbols occupied by the physical shared channel in the resource unit.

The position index of the last symbol occupied by the physical shared channel in the resource unit corresponds to the first type, and the quantity of symbols occupied by the physical shared channel in the resource unit corresponds to the second type.

Specifically, the network device may first send, to the terminal device, the first indication information used to indicate the mapping type of the physical shared channel. The terminal device receives the first indication information, and may determine, based on the first indication information, whether the mapping type that is of the physical shared channel and that is configured by the network device for the terminal device is the first type or the second type. If the mapping type of the physical shared channel is the first type, the terminal device may determine, with reference to the position index of the last symbol occupied by the physical shared channel in the resource unit, the time domain positions occupied by DMRSs in the resource unit. If the mapping type of the physical shared channel is the second type, the terminal device may determine, with reference to the quantity of symbols occupied by the physical shared channel in the resource unit, the time domain positions occupied by DMRSs in the resource unit. Optionally, the first indication information may be carried in downlink control information (DCI).

It should be understood that, the first type corresponds to the position index of the last symbol occupied by the physical shared channel in the resource unit, and the second type corresponds to the quantity of symbols occupied by the physical shared channel in the resource unit. This correspondence may be predefined in a protocol, or may be configured by the network device for the terminal device by using signaling. This is not limited in this embodiment of this application.

In a possible implementation, both the network device and the terminal device store DMRS configuration information, and the DMRS configuration information includes different time domain positions of the DMRSs in different mapping types of the physical shared channel. The network device configures the time domain positions of the DMRSs for the terminal device based on the DMRS configuration information, and notifies the terminal device by using the first indication information. The terminal device receives the first indication information, selects information corresponding to the mapping type of the physical shared channel from the DMRS configuration information based on the mapping type that is of the physical shared channel and that is indicated by the first indication information, and determines the time domain positions of the DMRSs in the resource unit with reference to a parameter corresponding to the mapping type of the physical shared channel.

The DMRSs may be classified into uplink DMRSs and downlink DMRSs, and the physical shared channel may include a physical uplink shared channel (PUSCH) and a physical downlink shared channel (PDSCH). Correspondingly, the position index of the last symbol occupied by the physical shared channel in the resource unit may also be referred to as the last symbol of the PUSCH, the last symbol of the PDSCH, the last symbol used for the PDSCH, or the last symbol used for the PUSCH in a slot. The quantity of symbols occupied by the physical shared channel in the resource unit may also be referred to as PUSCH duration in symbols, PDSCH duration in symbols, duration of the PUSCH transmission in symbols, or duration of the PDSCH transmission in symbols. If the DMRSs are uplink DMRSs, when the mapping type of the physical shared channel is the first type, the terminal device may use the last symbol of PUSCH; or when the mapping type of the physical shared channel is the second type, the terminal device may use the PUSCH duration in the symbols. If the DMRSs are downlink DMRSs, when the mapping type of the physical shared channel is the first type, the terminal device may use the last symbol of the PDSCH; or when the mapping type of the physical shared channel is the second type, the terminal device may use the PDSCH duration in the symbols.

According to the resource indication method in this embodiment of this application, different mapping types of the physical shared channel are configured to correspond to different parameters, and the network device sends, to the terminal device, the indication information used to indicate the mapping type of the physical shared channel, so that the terminal device can select the corresponding parameter based on the mapping type of the physical shared channel, to help the terminal device accurately determine the time domain positions occupied by DMRSs in the resource unit, thereby improving performance of data transmission between the network device and the terminal device.

In an optional embodiment, the DMRSs include a first DMRS and an additional DMRS; and the determining time domain positions occupied by DMRSs in a resource unit includes:

determining, by the terminal device, a time domain position occupied by the additional DMRS in the resource unit based on the mapping type of the physical shared channel and with reference to the position index of the last symbol occupied by the physical shared channel in the resource unit or the quantity of symbols occupied by the physical shared channel in the resource unit.

Specifically, the DMRSs may include the first DMRS (namely, a front-loaded DMRS) and the additional DMRS (namely, the additional DMRS). A time domain position of the first DMRS is decoupled from the time domain position of the additional DMRS, and there is no association relationship between the time domain position of the first DMRS and the time domain position of the additional DMRS. The time domain position of the first DMRS may be predefined in a protocol, or may be configured by the network device for the terminal device by using signaling. This is not limited in this embodiment of this application. Therefore, in this embodiment of this application, the terminal device only needs to determine the time domain position of the additional DMRS based on the mapping type of the physical shared channel and with reference to the parameter (the position index of the last symbol occupied by the physical shared channel in the resource unit or the quantity of symbols occupied by the physical shared channel in the resource unit) corresponding to the mapping type of the physical shared channel. After the time domain position of the additional DMRS is determined, the terminal device may determine the time domain positions of the DMRSs with reference to the time domain position of the first DMRS and the time domain position of the additional DMRS.

In an optional embodiment, the mapping type of the physical shared channel is the first type; and the determining a time domain position occupied by the additional DMRS in the resource unit includes:

determining, by the terminal device, the time domain position occupied by the additional DMRS in the resource unit based on at least the position index of the last symbol occupied by the physical shared channel in the resource unit and a first mapping relationship, where the first mapping relationship is used to indicate a correspondence between different position indexes of the last symbols of physical shared channels in the resource unit and different time domain positions occupied by additional DMRSs in the resource unit.

Specifically, if the mapping type of the physical shared channel is the first type, because a parameter corresponding to the first type is the position index of the last symbol occupied by the physical shared channel in the resource unit, the terminal device may determine the time domain position occupied by the additional DMRS in the resource unit based on the position index of the last symbol occupied by the physical shared channel in the resource unit and the first mapping relationship.

It should be understood that, in this specification, different additional DMRSs may be used to indicate different quantities of additional DMRSs, where for example, the quantity of additional DMRSs is 0, 1, 2, or 3; or may be used to indicate DMRSs having different actual quantities of symbols, where for example, the actual quantity of symbols of the DMRS is one symbol or two symbols; or may be used to indicate additional DMRSs in different positions. This is not limited in this embodiment of this application.

It should be further understood that, the first mapping relationship may be implemented by using a formula, a table, or another manner, and may be specifically used to indicate the correspondence between the different position indexes and the different time domain positions. In a possible implementation, the first mapping relationship is included in the DMRS configuration information. The terminal device may select the first mapping relationship from the DMRS configuration information based on the mapping type of the physical shared channel, namely, the first type, and select the time domain position occupied by the additional DMRS in the resource unit from the first mapping relationship with reference to the position index of the last symbol occupied by the physical shared channel in the resource unit. However, this is not limited in this embodiment of this application.

In an optional embodiment, the mapping type of the physical shared channel is the second type; and the determining a time domain position occupied by the additional DMRS in the resource unit includes:

determining, by the terminal device, the time domain position occupied by the additional DMRS in the resource unit based on at least the quantity of symbols occupied by the physical shared channel in the resource unit and a second mapping relationship, where the second mapping relationship is used to indicate a correspondence between different quantities of symbols occupied by physical shared channels in the resource unit and different time domain positions occupied by additional DMRSs in the resource unit.

Specifically, if the mapping type of the physical shared channel is the second type, because a parameter corresponding to the second type is the quantity of symbols occupied by the physical shared channel in the resource unit, the terminal device may determine the time domain position occupied by the additional DMRS in the resource unit based on the quantity of symbols occupied by the physical shared channel in the resource unit and the second mapping relationship.

It should be further understood that, the second mapping relationship may be implemented by using a formula, a table, or another manner, and may be specifically used to indicate the correspondence between the different quantities of symbols and the different time domain positions. In a possible implementation, the second mapping relationship is included in the DMRS configuration information. The terminal device may select the second mapping relationship from the DMRS configuration information based on the mapping type of the physical shared channel, namely, the second type, and select the time domain position occupied by the additional DMRS in the resource unit from the second mapping relationship with reference to the quantity of symbols occupied by the physical shared channel in the resource unit. However, this is not limited in this embodiment of this application.

In an optional embodiment, before the determining a time domain position occupied by the additional DMRS in the resource unit, the method further includes:

sending, by the network device, second indication information to the terminal device, where the second indication information is used to indicate a quantity of additional DMRSs;

sending, by the network device, third indication information to the terminal device, where the third indication information is used to indicate an actual quantity of symbols occupied by the first DMRS in the resource unit;

correspondingly receiving, by the terminal device, the second indication information sent by the network device; and receiving, by the terminal device, the third indication information sent by the network device; and the determining a time domain position occupied by the additional DMRS in the resource unit includes:

determining, by the terminal device, the time domain position occupied by the additional DMRS in the resource unit based on the mapping type of the physical shared channel, the quantity of additional DMRSs, and the actual quantity of symbols occupied by the first DMRS in the resource unit and with reference to the position index of the last symbol occupied by the physical shared channel in the resource unit or the quantity of symbols occupied by the physical shared channel in the resource unit.

Specifically, the network device may further send, to the terminal device, the second indication information used to indicate the quantity of additional DMRSs and the third indication information used to indicate the actual quantity of symbols occupied by the first DMRS in the resource unit. The terminal device may determine the time domain position occupied by the additional DMRS in the resource unit based on information such as the mapping type of the physical shared channel, the parameter corresponding to the mapping type of the physical shared channel, the quantity of additional DMRSs, and the actual quantity of symbols occupied by the first DMRS in the resource unit.

It should be understood that, the quantity of additional DMRSs may be 0, 1, 2, or 3, and the actual quantity of symbols occupied by the first DMRS in the resource unit may be 1 or 2. For different cases, the network device may configure different resource mapping manners for the terminal device. Therefore, there is also a correspondence between the time domain position occupied by the additional DMRS in the resource unit and parameters such as the quantity of additional DMRSs and the actual quantity of symbols occupied by the first DMRS in the resource unit. In a possible implementation, the DMRS configuration information may include a correspondence between different mapping types of physical shared channels, different quantities of additional DMRSs, different actual quantities of symbols occupied by the first DMRSs in the resource unit, and different time domain positions. However, this is not limited in this embodiment of this application.

It should be further understood that the second indication information may be carried in radio resource control (RRC) signaling. The third indication information may be indicated by using one piece of signaling or may be jointly indicated by using a plurality of pieces of signaling. This is not limited in this embodiment of this application. For example, the network device may first indicate, to the terminal device by using RRC signaling, a maximum quantity of symbols occupied by the first DMRS in the resource unit. If the maximum quantity of symbols is 1, the actual quantity of symbols occupied by the first DMRS in the resource unit is inevitably 1 and does not need to be further indicated. If the maximum quantity of symbols is 2, the actual quantity of symbols occupied by the first DMRS in the resource unit may be 1 or 2, and the network device needs to further indicate, to the terminal device by using downlink control information (DCI), the actual quantity of symbols occupied by the first DMRS in the resource unit.

In another possible implementation of this application, a resource configuration method is provided. The resource configuration method specifically includes: receiving demodulation reference signal (DMRS) configuration information, where the DMRS configuration information includes time domain positions of DMRSs in different mapping types of a physical shared channel, the mapping type of the physical shared channel is a first type or a second type, DMRS configuration information corresponding to the first type includes a position index of the last symbol occupied by the physical shared channel in a resource unit, and DMRS configuration information corresponding to the second type includes a quantity of symbols occupied by the physical shared channel in the resource unit; and storing the DMRS configuration information.

It should be understood that, the DMRS configuration information may be implemented by using a formula, a table, or another manner. Both the network device and the terminal device may store the DMRS configuration information, to subsequently configure the time domain positions of the DMRSs based on the DMRS configuration information.

This application is described in detail below with reference to a specific embodiment.

Case One: Uplink Transmission

The network device sends first indication information to the terminal device by using DCI. The terminal device receives the DCI, determines, based on the first indication information, whether a mapping type of a current PUSCH is a PUSCH mapping type A or a PUSCH mapping type B, and further selects Table 1 or Table 2.

For the PUSCH mapping type A, time domain positions of DMRSs are defined relative to a start symbol position in a slot. In this case, a position $l_0$ of the first DMRS symbol in time domain may be configured to 2 (the third symbol of the slot) or 3 (the fourth symbol of the slot) by using higher layer signaling DL-DMRS-typeA-pos. For the PUSCH mapping type B, time domain positions of DMRSs are defined relative to a start symbol position of a resource of a scheduled PUSCH. In this case, a position $l_0$ of the first DMRS symbol in time domain is the first symbol of the PUSCH, and has an index of 0 relative to a time domain position of the PUSCH.

The network device may indicate an actual quantity of symbols of a front-loaded DMRS to the terminal device by using third indication information. The terminal device may determine, based on the actual quantity of symbols of the front-loaded DMRS, to select a DMRS location corresponding to a single-symbol DMRS or a double-symbol DMRS. Specifically, the network device may configure a maximum quantity of symbols of the front-loaded DMRS by using RRC signaling (UL-DMRS-max-len). When UL-DMRS-max-len=1, the front-loaded DMRS is the single-symbol DMRS; or when UL-DMRS-max-len=2, the network device may further configure the actual quantity of symbols of the front-loaded DMRS by using DCI signaling. The terminal device obtains, based on the RRC signaling or with reference to the RRC signaling and the DCI signaling, the current front-loaded DMRS being the single-symbol DMRS or the double-symbol DMRS.

The network device may indicate a quantity of additional DMRSs to the terminal device by using second indication information. Specifically, the network device sends UL-DMRS-add-pos by using RRC signaling. The terminal device receives the RRC signaling to obtain the quantity of additional DMRSs, and selects a corresponding DMRS position set from a table.

The network device may indicate a quantity of consecutive symbols of the PUSCH (PUSCH duration in symbols) and a start symbol position of the PUSCH to the terminal device by using DCI signaling. The terminal device receives the DCI signaling, and may obtain the PUSCH duration in the symbols or a position of the last symbol of the PUSCH (position of the last PUSCH symbols), and determines the final time domain positions of the DMRSs based on the mapping type of the PUSCH. Specifically, when the mapping type of the PUSCH is the PUSCH mapping type A, the terminal device determines the time domain positions of the DMRSs in Table 1 by using the position of the last PUSCH symbols. When the mapping type of the PUSCH is the PUSCH mapping type B, the terminal device determines the time domain positions of the DMRSs in Table 2 by using the PUSCH duration in the symbols. Further, the terminal device may map and send the DMRSs in the position.

It should be understood that, the foregoing processes are merely examples of descriptions for ease of understanding. In a specific implementation, there may be no specific chronological order between the processes. The terminal device may use a different sequence with reference to the foregoing signaling, provided that the time domain positions of the DMRSs can be determined.

TABLE 1

Time domain positions of uplink DMRSs in the PUSCH mapping type A

| Position of last PUSCH symbol | DM-RS positions $\bar{l}$ | | | | | | | |
|---|---|---|---|---|---|---|---|---|
| | single-symbol DM-RS UL-DMRS-add-pos | | | | double-symbol DM-RS UL-DMRS-add-pos | | | |
| | 0 | 1 | 2 | 3 | 0 | 1 | 2 | 3 |
| ≤7 | $l_0$ | — | — | — | $l_0$ | — | | |
| 8 | $l_0$ | $l_0$, 7 | — | — | $l_0$ | — | | |
| 9 | $l_0$ | $l_0$, 9 | $l_0$, 6, 9 | — | $l_0$ | $l_0$, 8 | | |
| 10 | $l_0$ | $l_0$, 9 | $l_0$, 6, 9 | — | $l_0$ | $l_0$, 8 | | |
| 11 | $l_0$ | $l_0$, 9 | $l_0$, 6, 9 | $l_0$, 5, 8, 11 | $l_0$ | $l_0$, 8 | | |
| 12 | $l_0$ | $l_0$, 11 | $l_0$, 7, 11 | $l_0$, 5, 8, 11 | $l_0$ | $l_0$, 10 | | |
| 13 | $l_0$ | $l_0$, 11 | $l_0$, 7, 11 | $l_0$, 5, 8, 11 | $l_0$ | $l_0$, 10 | | |

TABLE 2

Time domain positions of uplink DMRSs in the PUSCH mapping type B

| PUSCH duration in symbols | DM-RS positions $\bar{l}$ | | | | | | | |
|---|---|---|---|---|---|---|---|---|
| | single-symbol DM-RS UL-DMRS-add-pos | | | | double-symbol DM-RS UL-DMRS-add-pos | | | |
| | 0 | 1 | 2 | 3 | 0 | 1 | 2 | 3 |
| ≤4 | $l_0$ | — | — | — | $l_0$ | — | | |
| 5 | $l_0$ | $l_0$, 4 | — | — | $l_0$ | — | | |
| 6 | $l_0$ | $l_0$, 4 | — | — | $l_0$ | — | | |
| 7 | $l_0$ | $l_0$, 4 | — | — | $l_0$ | — | | |
| 8 | $l_0$ | $l_0$, 6 | $l_0$, 3, 6 | — | $l_0$ | $l_0$, 5 | | |
| 9 | $l_0$ | $l_0$, 6 | $l_0$, 3, 6 | — | $l_0$ | $l_0$, 5 | | |
| 10 | $l_0$ | $l_0$, 8 | $l_0$, 4, 8 | $l_0$, 3, 6, 9 | $l_0$ | $l_0$, 7 | | |
| 11 | $l_0$ | $l_0$, 8 | $l_0$, 4, 8 | $l_0$, 3, 6, 9 | $l_0$ | $l_0$, 7 | | |
| 12 | $l_0$ | $l_0$, 10 | $l_0$, 5, 10 | $l_0$, 3, 6, 9 | $l_0$ | $l_0$, 9 | | |
| 13 | $l_0$ | $l_0$, 10 | $l_0$, 5, 10 | — | $l_0$ | $l_0$, 9 | | |
| 14 | — | — | — | — | — | — | | |

Specifically, a position of a DMRS symbol may be represented by $\bar{l}$, the last symbol of the PUSCH in the slot is used in Table 1, and the quantity of consecutive symbols of the PUSCH is used in Table 2. In addition, when DL-DMRS-typeA-pos is equal to 2, UL-DMRS-add-pos may be equal to 3 in the mapping type A only. (The position(s) of the DMRS symbols is given by $\bar{l}$ and the last OFDM symbol used for PUSCH in the slot according to Table 1 and the duration of PUSCH transmission in the symbols according to and Table 2 respectively. The case UL-DMRS-add-pos equal to 3 of PUSCH mapping type A is only supported when DL-DMRS-typeA-pos is equal to 2.)

Figure 5:
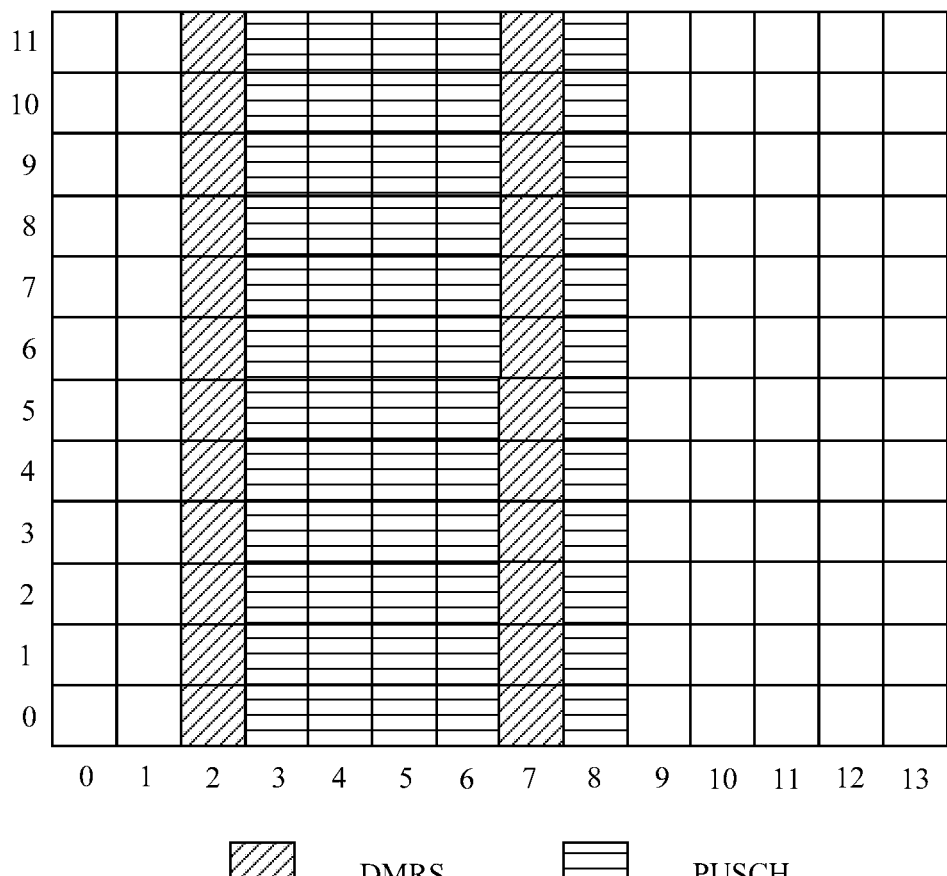
FIG. 5 is a schematic diagram of a DMRS pattern according to an embodiment of this application.
Figure 6:
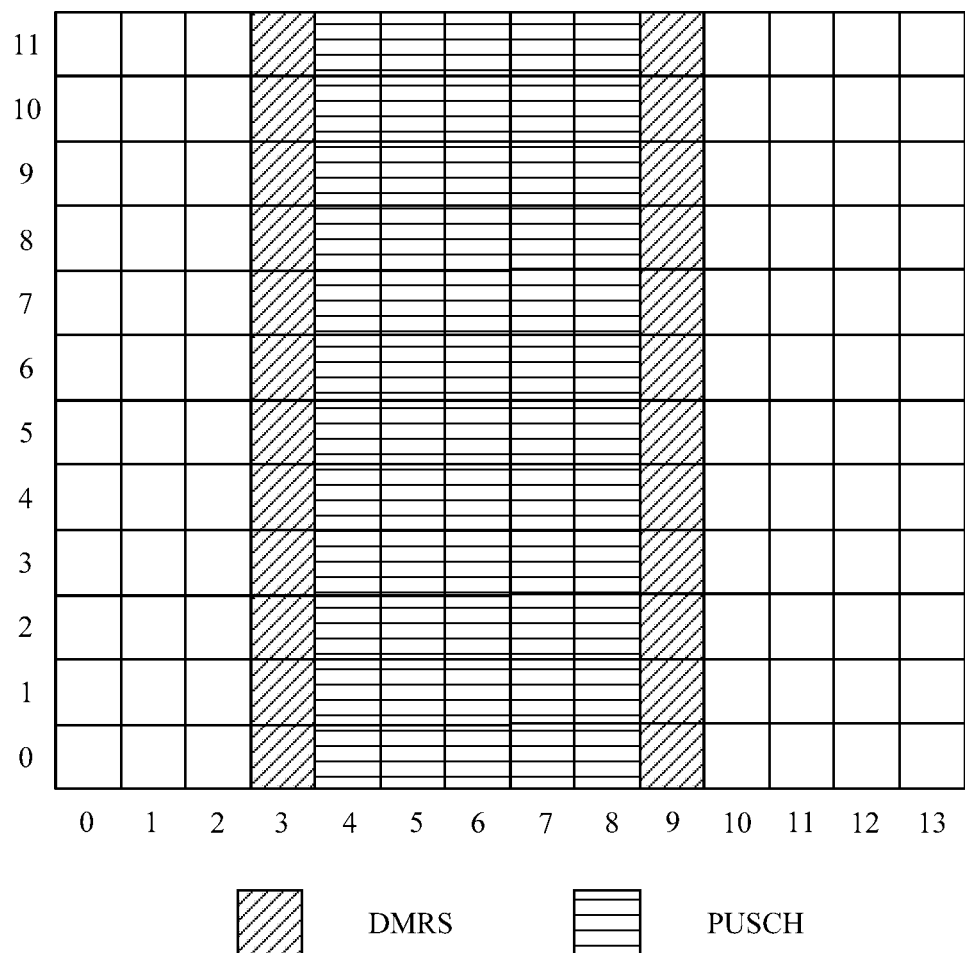
FIG. 6 is a schematic diagram of another DMRS pattern according to an embodiment of this application.

Assuming that the mapping type of the PUSCH is the PUSCH mapping type A, the terminal device selects Table 1 and determines that the position of the last PUSCH symbol is 8, the actual quantity of symbols of the front-loaded DMRS is the single-symbol DMRS, and the quantity of additional DMRSs is 1. In this case, the terminal device may select a time domain position being 7 of the additional DMRS from Table 1. A specific DMRS pattern is shown in FIG. 5. FIG. 5 shows an example in which the front-loaded DMRS is located at 2 (the third symbol of the slot). Assuming that the mapping type of the PUSCH is the PUSCH mapping type A, the terminal device selects Table 1 and determines that the position of the last PUSCH symbol is 9, the actual quantity of symbols of the front-loaded DMRS is the single-symbol DMRS, and the quantity of additional DMRSs is 1. In this case, the terminal device may select a time domain position being 9 of the additional DMRS from Table 1. A specific DMRS pattern is shown in FIG. 6. FIG. 6 shows an example in which the front-loaded DMRS is located at 3 (the fourth symbol of the slot). Assuming that the mapping type of the PUSCH is the PUSCH mapping type B, the terminal device selects Table 2 and determines that the PUSCH duration in the symbols is 9, the actual quantity of symbols of the front-loaded DMRS is the single-symbol DMRS, and the quantity of additional DMRSs is 2. In this case, the terminal device may select time domain positions being 3 and 6 of the additional DMRSs from Table 2.

It should be understood that, "—" in Table 1 and Table 2 indicates that the configuration is not supported. In a specific implementation, to satisfy a requirement for flexible scheduling, the configuration may be replaced with another DMRS position configuration. For example, only $l_0$ may be included, or a configuration in which a quantity of UL-DMRS-add-pos is decreased by 1 is used, or a DMRS beyond a PUSCH range may be punctured (puncture). For example, in Table 1, when the single-symbol DMRS is configured as UL-DMRS-add-pos=2, if the position of the last PUSCH symbol=8, corresponding "—" may be separately replaced with "$l_0$", "$l_0$, 7", or "$l_0$, 6" by using the foregoing method. However, this is not limited in this embodiment of this application.

It should be further understood that, Table 1 and Table 2 may be two independent tables, or may be combined into one table, or may be embedded into another table. A specific form of expression of the tables is not limited in this embodiment of this application.

Case Two: Downlink Transmission

The network device sends first indication information to the terminal device by using DCI. The terminal device receives the DCI, determines, based on the first indication information, whether a mapping type of a current PDSCH is a PDSCH mapping type A or a PDSCH mapping type B, and further selects Table 3 or Table 4.

For the PDSCH mapping type A, time domain positions of DMRSs are defined relative to a start symbol position in a slot. In this case, a position $l_0$ of the first DMRS symbol in time domain may be configured to 2 (the third symbol of the slot) or 3 (the fourth symbol of the slot) by using higher layer signaling DL-DMRS-typeA-pos. For the PDSCH mapping type B, time domain positions of DMRSs are defined relative to a start symbol position of a resource of a scheduled PDSCH. In this case, a position $l_0$ of the first DMRS symbol in time domain is the first symbol of the PDSCH, and has an index of 0 relative to a time domain position of the PDSCH.

The network device may indicate a quantity of additional DMRSs to the terminal device by using second indication information. Specifically, the network device sends DL-DMRS-add-pos by using RRC signaling. The terminal device receives the RRC signaling to obtain the quantity of additional DMRSs, and selects a corresponding DMRS position set from a table.

The network device may indicate an actual quantity of symbols of a front-loaded DMRS to the terminal device by using third indication information. The terminal device may determine, based on the actual quantity of symbols of the front-loaded DMRS, to select a DMRS location corresponding to a single-symbol DMRS or a double-symbol DMRS. Specifically, the network device may configure a maximum quantity of symbols of the front-loaded DMRS by using RRC signaling (DL-DMRS-max-len). When DL-DMRS-max-len=1, the front-loaded DMRS is the single-symbol DMRS; or when DL-DMRS-max-len=2, the network device may further configure the actual quantity of symbols of the front-loaded DMRS by using DCI signaling. The terminal device obtains, based on the RRC signaling or with reference to the RRC signaling and the DCI signaling, the current front-loaded DMRS being the single-symbol DMRS or the double-symbol DMRS.

The network device may indicate a quantity of consecutive symbols of the PDSCH (PDSCH duration in symbols) and a start symbol position of the PDSCH to the terminal device by using DCI signaling. The terminal device receives the DCI signaling, to obtain the PDSCH duration in the symbols or a position of the last symbol of the PDSCH (position of the last PDSCH symbol), and determine the final time domain positions of the DMRSs based on the mapping type of the PDSCH. Specifically, when the mapping type of the PDSCH is the PDSCH mapping type A, the terminal device determines the time domain positions of the DMRSs in Table 1 by using the position of the last PDSCH symbol. When the mapping type of the PDSCH is the PDSCH mapping type B, the terminal device determines the time domain positions of the DMRSs in Table 2 by using the PDSCH duration in the symbols. Further, the terminal device may map and receive, in the position, the DMRSs sent by the network device.

TABLE 3

Time domain positions of downlink DMRSs in the PDSCH mapping type A

| Position of last PDSCH symbol | single-symbol DM-RS DL-DMRS-add-pos | | | | double-symbol DM-RS DL-DMRS-add-pos | | | |
|---|---|---|---|---|---|---|---|---|
| | 0 | 1 | 2 | 3 | 0 | 1 | 2 | 3 |
| ≤7 | $l_0$ | — | — | — | $l_0$ | — | | |
| 8 | $l_0$ | $l_0$, 7 | — | — | $l_0$ | — | | |
| 9 | $l_0$ | $l_0$, 9 | $l_0$, 6, 9 | — | $l_0$ | $l_0$, 8 | | |
| 10 | $l_0$ | $l_0$, 9 | $l_0$, 6, 9 | — | $l_0$ | $l_0$, 8 | | |
| 11 | $l_0$ | $l_0$, 9 | $l_0$, 6, 9 | $l_0$, 5, 8, 11 | $l_0$ | $l_0$, 8 | | |
| 12 | $l_0$ | $l_0$, 11 | $l_0$, 7, 11 | $l_0$, 5, 8, 11 | $l_0$ | $l_0$, 10 | | |
| 13 | $l_0$ | $l_0$, 11 | $l_0$, 7, 11 | $l_0$, 5, 8, 11 | $l_0$ | $l_0$, 10 | | |

TABLE 4

Time domain positions of downlink DMRSs in the PDSCH mapping type B

| Duration of PDSCH transmission | single-symbol DM-RS DL-DMRS-add-pos | | | double-symbol DM-RS DL-DMRS-add-pos | | |
|---|---|---|---|---|---|---|
| | 0 | 1 | 2 | 0 | 1 | 2 |
| ≤6 | $l_0$ | — | | $l_0$ | — | |
| 7 | $l_0$ | $l_0$, 4 | | $l_0$ | $l_0$, 4 | |
| 8 | $l_0$ | — | | $l_0$ | — | |
| 9 | $l_0$ | — | | $l_0$ | — | |
| 10 | $l_0$ | — | | $l_0$ | — | |
| 11 | $l_0$ | — | | $l_0$ | — | |
| 12 | $l_0$ | — | | $l_0$ | — | |
| 13 | $l_0$ | — | | $l_0$ | — | |
| 14 | $l_0$ | — | | $l_0$ | — | |

Specifically, a position of a DMRS symbol may be represented by $\bar{l}$, the last symbol of the PDSCH in the slot is used in Table 3, and the quantity of consecutive symbols of the PDSCH is used in Table 4. In addition, when DL-DMRS-typeA-pos is equal to 2, DL-DMRS-add-pos may be equal to 3 in the PDSCH mapping type A only. (The position(s) of the DMRS symbols is given by $\bar{l}$ and the last OFDM symbol used for the PDSCH in the slot according to Table 3 and the duration of PDSCH transmission in symbols according to Table 4 respectively. The case DL-DMRS-add-pos equal to 3 of PDSCH mapping type A is only supported when DL-DMRS-typeA-pos is equal to 2.)

Figure 7:
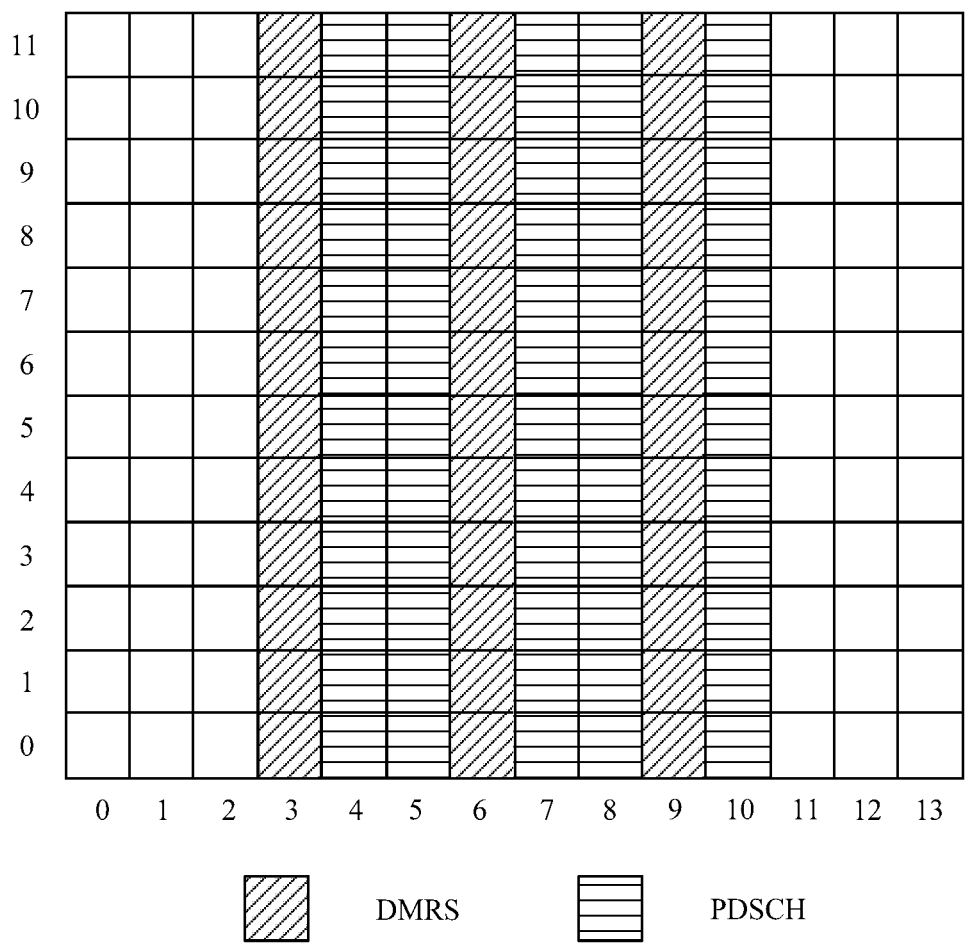
FIG. 7 is a schematic diagram of another DMRS pattern according to an embodiment of this application.
Figure 8:
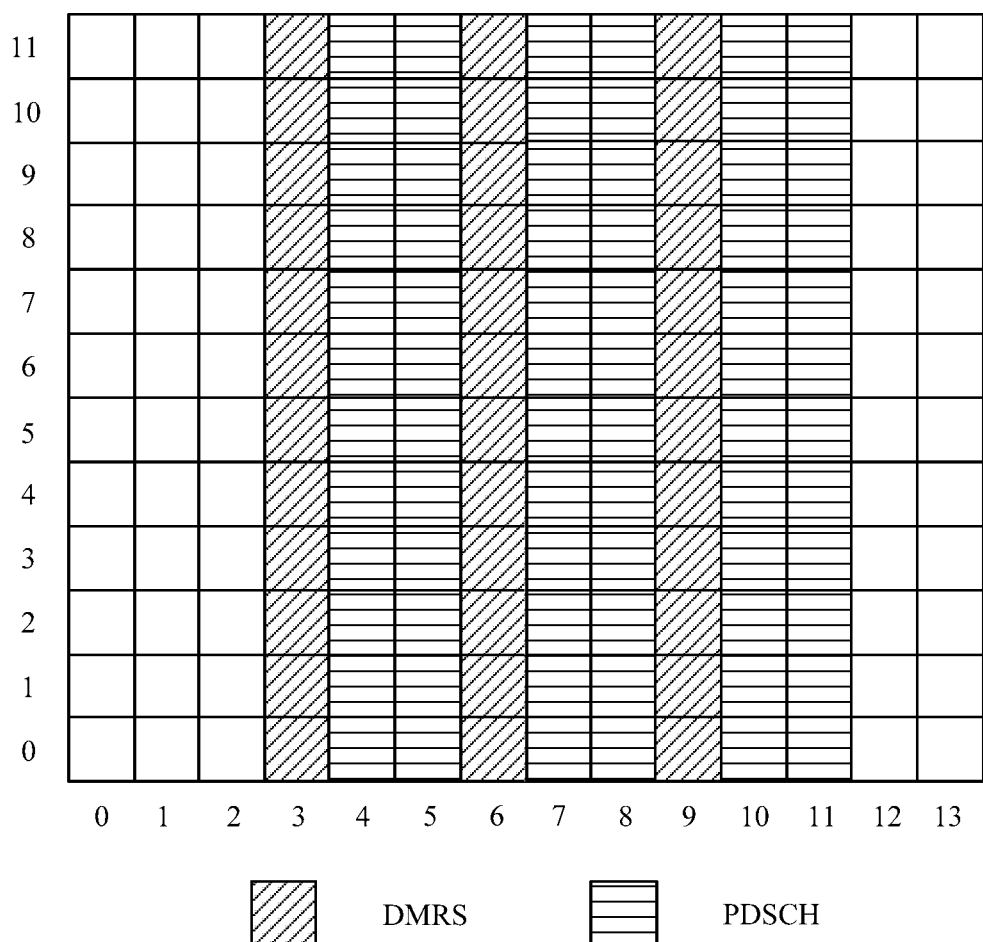
FIG. 8 is a schematic diagram of another DMRS pattern according to an embodiment of this application.

Assuming that the mapping type of the PDSCH is the PDSCH mapping type A, the terminal device selects Table 3 and determines that the position of last PDSCH symbol is 10, the actual quantity of symbols of the front-loaded DMRS is the single-symbol DMRS, and the quantity of additional DMRSs is 2. In this case, the terminal device may select time domain positions being 6 and 9 of the additional DMRSs from Table 3. A specific DMRS pattern is shown in FIG. 7. FIG. 7 shows an example in which the front-loaded DMRS is located at 3 (the fourth symbol of the slot). Assuming that the mapping type of the PDSCH is the PDSCH mapping type A, the terminal device selects Table 3 and determines that the position of last PDSCH symbol is 11, the actual quantity of symbols of the front-loaded DMRS is the single-symbol DMRS, and the quantity of additional DMRSs is 2. In this case, the terminal device may select time domain positions being 6 and 9 of the additional DMRSs from Table 3. A specific DMRS pattern is shown in FIG. 8. FIG. 8 shows an example in which the front-loaded DMRS is located at 3 (the fourth symbol of the slot). Assuming that the mapping type of the PDSCH is the PDSCH mapping type B, the terminal device selects Table 4 and determines that the PDSCH duration in the symbols is 7, the actual quantity of symbols of the front-loaded DMRS is the single-symbol DMRS, and the quantity of additional DMRSs is 1. In this case, the terminal device may select a time domain position being 4 of the additional DMRS from Table 4.

It should be understood that, "—" in Table 1 and Table 2 indicate that the configuration is not supported, and in a specific implementation, may be processed in a manner similar to that in Table 1 and Table 2. It should be further understood that, Table 3 and Table 4 may be two independent tables, or may be combined into one table, or may be embedded into another table. Table 1 to Table 4 may alternatively be combined into one table. A specific form of expression of the tables is not limited in this embodiment of this application.

Figure 4:
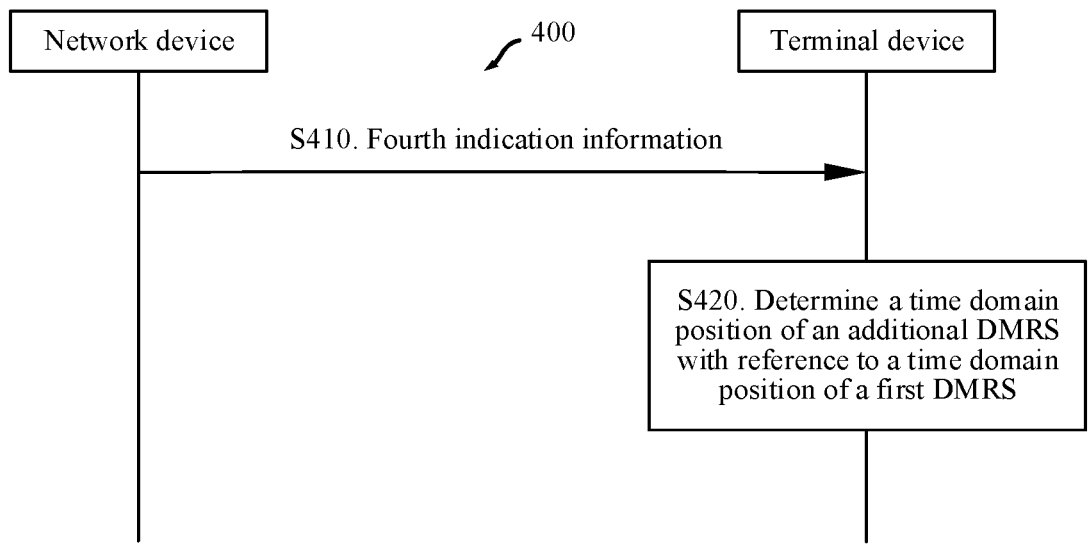
FIG. 4 is a schematic flowchart of another resource indication method according to an embodiment of this application.

FIG. 4 is a schematic flowchart of another resource indication method 400 according to an embodiment of this application. The method 400 may be applied to the communications system 100 shown in FIG. 1, but this embodiment of this application is not limited thereto.

S410. A network device sends fourth indication information to a terminal device, and correspondingly, the terminal device receives the fourth indication information sent by the network device, where the fourth indication information is used to indicate a mapping type of a physical shared channel of demodulation reference signals and a quantity of symbols occupied by the physical shared channel in a resource unit, and the mapping type of the physical shared channel is a first type or a second type.

S420. The terminal device determines a time domain position occupied by an additional DMRS in the DMRSs in the resource unit based on the mapping type of the physical shared channel, the quantity of symbols occupied by the physical shared channel in the resource unit, and a time domain position occupied by a first DMRS in the DMRSs in the resource unit.

Specifically, the network device may send, to the terminal device, the fourth indication information used to indicate the mapping type of the physical shared channel and the quantity of symbols occupied by the physical shared channel in the resource unit. The terminal device receives the fourth indication information, and may determine the time domain position occupied by the additional DMRS in the resource unit based on the mapping type of the physical shared channel and the quantity of symbols occupied by the physical shared channel in the resource unit and with reference to the time domain position occupied by the first DMRS in the resource unit, namely, $l_0$. Optionally, the fourth indication information may be carried in downlink control information (DCI).

It should be understood that, the mapping type of the physical shared channel may be the first type or the second type, and parameters corresponding to the first type and the second type are both the quantity of symbols (duration) occupied by the physical shared channel in the resource unit. A specific chronological order of determining the time domain position of the additional DMRS by the terminal device is not limited in this embodiment of this application. For example, the terminal device may first perform selection based on the mapping type of the physical shared channel, then perform selection based on the duration of the physical shared channel, and at last, select the final time domain position of the additional DMRS based on $l_0$. Alternatively, the terminal device may first perform selection based on $l_0$ and then based on the mapping type of the physical shared channel, and finally select the final time domain position of the additional DMRS based on the duration of the physical shared channel. There are a plurality of possible implementations, and this is not limited in this embodiment of this application.

In a possible implementation, both the network device and the terminal device store DMRS configuration information, and the DMRS configuration information includes time domain positions of the DMRSs in different mapping types of the physical shared channel. The network device configures time domain positions of the DMRSs for the terminal device based on the DMRS configuration information, and notifies the terminal device by using the fourth indication information. The terminal device receives the fourth indication information, and determines the time domain positions of the DMRSs in the resource unit based on the mapping type of the physical shared channel and the duration of the physical shared channel that are indicated by the fourth indication information and with reference to the time domain position of the first DMRS.

The DMRSs may be classified into uplink DMRSs and downlink DMRSs, and the physical shared channel may include a physical uplink shared channel (PUSCH) and a physical downlink shared channel (PDSCH). Correspondingly, the quantity of symbols occupied by the physical shared channel in the resource unit may also be referred to as PUSCH duration in symbols or PDSCH duration in symbols. If the DMRSs are uplink DMRSs, the terminal device may use the PUSCH duration in the symbols. If the DMRSs are downlink DMRSs, the terminal device may use the PDSCH duration in the symbols.

According to the resource indication method in this embodiment of this application, the terminal device determines the time domain position of the additional DMRS based on the indication information that is sent by the network device and that is used to indicate the mapping type of the physical shared channel and the quantity of symbols occupied by the physical shared channel in the resource unit and with reference to the time domain position of the first DMRS, to help accurately determine the time domain positions occupied by DMRSs in the resource unit, thereby improving performance of data transmission between the network device and the terminal device.

In an optional embodiment, before the determining a time domain position occupied by an additional DMRS in the DMRSs in the resource unit, the method further includes:

sending, by the network device, fifth indication information to the terminal device, where the fifth indication information is used to indicate the time domain position occupied by the first DMRS in the resource unit; and correspondingly receiving, by the terminal device, the fifth indication information sent by the network device.

It should be understood that, the time domain position $l_0$ occupied by the first DMRS in the resource unit may be predefined in a protocol, or may be configured by the network device for the terminal device by using signaling. This is not limited in this embodiment of this application. Specifically, the network device may send the fifth indication information to the terminal device to indicate $l_0$.

In an optional embodiment, the mapping type of the physical shared channel is the first type; and the determining a time domain position occupied by an additional DMRS in the DMRSs in the resource unit includes:

determining, by the terminal device, the time domain position occupied by the additional DMRS in the resource unit based on the quantity of symbols occupied by the physical shared channel in the resource unit, the time domain position occupied by the first DMRS in the resource unit, and a third mapping relationship, where the third mapping relationship is used to indicate a correspondence between different quantities of symbols occupied by physical shared channels in the resource unit, different time domain positions occupied by the first DMRSs in the resource unit, and different time domain positions occupied by additional DMRSs in the resource unit.

Specifically, if the mapping type of the physical shared channel is the first type, the terminal device may determine the time domain position occupied by the additional DMRS in the resource unit based on the quantity of symbols occupied by the physical shared channel in the resource unit, the time domain position occupied by the first DMRS in the resource unit, and the third mapping relationship.

It should be understood that, the third mapping relationship may be implemented by using a formula, a table, or another manner, and may be specifically used to indicate the correspondence between the different quantities of symbols and the different time domain positions. In a possible implementation, the third mapping relationship is included in the DMRS configuration information. The terminal device may select the third mapping relationship from the DMRS configuration information based on the mapping type of the physical shared channel, namely, the first type, and select the time domain position occupied by the additional DMRS in the resource unit from the third mapping relationship with reference to the quantity of symbols occupied by the physical shared channel in the resource unit and the time domain position occupied by the first DMRS in the resource unit. However, this is not limited in this embodiment of this application.

In an optional embodiment, the mapping type of the physical shared channel is the second type; and the determining a time domain position occupied by an additional DMRS in the DMRSs in the resource unit includes:

determining, by the terminal device, the time domain position occupied by the additional DMRS in the resource unit based on the quantity of symbols occupied by the physical shared channel in the resource unit, the time domain position occupied by the first DMRS in the resource unit, and a fourth mapping relationship, where the fourth mapping relationship is used to indicate a correspondence between different quantities of symbols occupied by physical shared channels in the resource unit, different time domain positions occupied by the first DMRSs in the resource unit, and different time domain positions occupied by additional DMRSs in the resource unit.

Specifically, if the mapping type of the physical shared channel is the second type, the terminal device may determine the time domain position occupied by the additional DMRS in the resource unit based on the quantity of symbols occupied by the physical shared channel in the resource unit, the time domain position occupied by the first DMRS in the resource unit, and the fourth mapping relationship.

It should be further understood that, the fourth mapping relationship may be implemented by using a formula, a table, or another manner, and may be specifically used to indicate the correspondence between the different quantities of symbols and the different time domain positions. In a possible implementation, the fourth mapping relationship is included in the DMRS configuration information. The terminal device may select the fourth mapping relationship from the DMRS configuration information based on the mapping type of the physical shared channel, namely, the second type, and select the time domain position occupied by the additional DMRS in the resource unit from the fourth mapping relationship with reference to the quantity of symbols occupied by the physical shared channel in the resource unit and the time domain position occupied by the first DMRS in the resource unit. However, this is not limited in this embodiment of this application.

In an optional embodiment, before the determining a time domain position occupied by an additional DMRS in the DMRSs in the resource unit, the method further includes:

sending, by the network device, sixth indication information to the terminal device, where the sixth indication information is used to indicate a quantity of additional DMRSs;

sending, by the network device, seventh indication information to the terminal device, where the seventh indication information is used to indicate an actual quantity of symbols occupied by the first DMRS in the resource unit; and correspondingly receiving, by the terminal device, the sixth indication information and the seventh indication information that are sent by the network device; and the determining a time domain position occupied by an additional DMRS in the DMRSs in the resource unit includes:

determining, by the terminal device, the time domain position occupied by the additional DMRS in the resource unit based on the mapping type of the physical shared channel, the quantity of symbols occupied by the physical shared channel in the resource unit, the time domain position occupied by the first DMRS in the DMRSs in the resource unit, the quantity of additional DMRSs, and the actual quantity of symbols occupied by the first DMRS in the resource unit.

Specifically, the network device may further send, to the terminal device, the sixth indication information used to indicate the quantity of additional DMRSs and the seventh indication information used to indicate the actual quantity of symbols occupied by the first DMRS in the resource unit. The terminal device may determine the time domain position occupied by the additional DMRS in the resource unit based on information such as the mapping type of the physical shared channel, the quantity of symbols occupied by the physical shared channel in the resource unit, the quantity of additional DMRSs, and the actual quantity of symbols occupied by the first DMRS in the resource unit.

It should be understood that, the quantity of additional DMRSs may be 0, 1, 2, or 3, and the actual quantity of symbols occupied by the first DMRS in the resource unit may be 1 or 2. For different cases, the network device may configure different resource mapping manners for the terminal device. Therefore, there is also a correspondence between the time domain position occupied by the additional DMRS in the resource unit and parameters such as the quantity of additional DMRSs and the actual quantity of symbols occupied by the first DMRS in the resource unit. In a possible implementation, the DMRS configuration information may include a correspondence between different mapping types of physical shared channels, different quantities of additional DMRSs, different actual quantities of symbols occupied by the first DMRSs in the resource unit, and different time domain positions. However, this is not limited in this embodiment of this application.

It should be further understood that the sixth indication information may be carried in radio resource control (RRC) signaling. The seventh indication information may be indicated by using one piece of signaling or may be jointly indicated by using a plurality of pieces of signaling. This is not limited in this embodiment of this application. For example, the network device may first indicate, to the terminal device by using RRC signaling, a maximum quantity of symbols occupied by the first DMRS in the resource unit. If the maximum quantity of symbols is 1, the actual quantity of symbols occupied by the first DMRS in the resource unit is inevitably 1 and does not need to be further indicated. If the maximum quantity of symbols is 2, the actual quantity of symbols occupied by the first DMRS in the resource unit may be 1 or 2, and the network device needs to further indicate, to the terminal device by using downlink control information (DCI), the actual quantity of symbols occupied by the first DMRS in the resource unit.

In another possible implementation of this application, another resource configuration method is provided. The resource configuration method specifically includes: receiving demodulation reference signal (DMRS) configuration information, where DMRSs include a first DMRS and an additional DMRS, the DMRS configuration information includes time domain positions that are of additional DMRSs and that correspond to different time domain positions of the first DMRSs in different mapping types of a physical shared channel, and the mapping types of the physical shared channel include a first type and a second type; and storing the DMRS configuration information.

It should be understood that, the DMRS configuration information may be implemented by using a formula, a table, or another manner. Both the network device and the terminal device may store the DMRS configuration information, to subsequently configure the time domain positions of the DMRSs based on the DMRS configuration information.

This application is described in detail below with reference to another specific embodiment.

Case One: Uplink Transmission

The network device sends seventh indication information to the terminal device by using RRC signaling, to indicate an actual quantity of symbols of a front-loaded DMRS. The terminal device receives the RRC signaling, and selects, by using the seventh indication information, Table 5 corresponding to a single-symbol DMRS or Table 6 corresponding to a double-symbol DMRS. Specifically, the network device may configure a maximum quantity of symbols of the front-loaded DMRS by using RRC signaling (UL-DMRS-max-len). When UL-DMRS-max-len=1, the front-loaded DMRS is the single-symbol DMRS; or when UL-DMRS-max-len=2, the network device may further configure the actual quantity of symbols of the front-loaded DMRS by using DCI signaling. The terminal device obtains, based on the RRC signaling or with reference to the RRC signaling and the DCI signaling, the current front-loaded DMRS being the single-symbol DMRS or the double-symbol DMRS, and further determines to select Table 5 corresponding to the single-symbol DMRS or Table 6 corresponding to the double-symbol DMRS.

The network device sends fourth indication information to the terminal device by using DCI. The terminal device receives the DCI, determines, based on the fourth indication information, whether a mapping type of a current PUSCH is a PUSCH mapping type A or a PUSCH mapping type B, and selects a corresponding column from the table. For the PUSCH mapping type A, time domain positions of DMRSs are defined relative to a start symbol position in a slot. In this case, a position $l_0$ of the first DMRS symbol in time domain may be configured to 2 (the third symbol of the slot) or 3 (the fourth symbol of the slot) by using higher layer signaling DL-DMRS-typeA-pos. For the PUSCH mapping type B, time domain positions of DMRSs are defined relative to a start symbol position of a resource of a scheduled PUSCH. In this case, a position $l_0$ of the first DMRS symbol in time domain is the first symbol of the PUSCH, and has an index of 0 relative to a time domain position of the PUSCH.

The network device may indicate a quantity of additional DMRSs to the terminal device by using sixth indication information. Specifically, the network device sends UL-DMRS-add-pos by using RRC signaling. The terminal device receives the RRC signaling to obtain the quantity of additional DMRSs, and selects a corresponding column (a DMRS position set) from the table.

The network device may indicate a quantity of consecutive symbols of the PUSCH (PUSCH duration in symbols) and a start symbol position of the PUSCH to the terminal device by using DCI signaling. The terminal device receives the DCI signaling, to obtain the PUSCH duration in the symbols, and determines the final time domain positions of the DMRSs with reference to a specific value of the position $l_0$ of the front-loaded DMRS. Further, the terminal device may map and send the DMRSs in the position.

It should be understood that, the foregoing processes are merely examples of descriptions for ease of understanding. In a specific implementation, there may be no specific chronological order between the processes. The terminal device may use a different sequence with reference to the foregoing signaling, provided that the time domain positions of the DMRSs can be determined.

TABLE 5

Time domain positions of uplink DMRSs in a case of a single-symbol DMRS

| | | DM-RS positions $\bar{l}$ | | | | | | | | |
|---|---|---|---|---|---|---|---|---|---|---|
| | | PUSCH mapping type A UL-DMRS-add-pos | | | | | | PUSCH mapping type B UL-DMRS-add-pos | | | |
| PUSCH duration in symbols | | 1 | | 2 | | 3 | | 0 | 1 | 2 | 3 |
| | 0 | $l_0 = 2$ | $l_0 = 3$ | $l_0 = 2$ | $l_0 = 3$ | $l_0 = 2$ | $l_0 = 3$ | $l_0 = 0$ | $l_0 = 0$ | $l_0 = 0$ | $l_0 = 0$ |
| ≤4 | $l_0$ | — | — | — | — | — | — | $l_0$ | — | — | — |
| 5 | $l_0$ | — | — | — | — | — | — | $l_0$ | $l_0$, 4 | — | — |
| 6 | $l_0$ | — | $l_0$, 7 | — | — | — | — | $l_0$ | $l_0$, 4 | — | — |
| 7 | $l_0$ | $l_0$, 7 | $l_0$, 9 | — | $l_0$, 6, 9 | — | — | $l_0$ | $l_0$, 4 | — | — |
| 8 | $l_0$ | $l_0$, 9 | $l_0$, 9 | $l_0$, 6, 9 | $l_0$, 6, 9 | — | — | $l_0$ | $l_0$, 6 | $l_0$, 3, 6 | — |
| 9 | $l_0$ | $l_0$, 9 | $l_0$, 9 | $l_0$, 6, 9 | $l_0$, 6, 9 | — | — | $l_0$ | $l_0$, 6 | $l_0$, 3, 6 | — |
| 10 | $l_0$ | $l_0$, 9 | $l_0$, 11 | $l_0$, 6, 9 | $l_0$, 7, 11 | $l_0$, 5, 8, 11 | — | $l_0$ | $l_0$, 8 | $l_0$, 4, 8 | $l_0$, 3, 6, 9 |
| 11 | $l_0$ | $l_0$, 11 | $l_0$, 11 | $l_0$, 7, 11 | $l_0$, 7, 11 | $l_0$, 5, 8, 11 | — | $l_0$ | $l_0$, 8 | $l_0$, 4, 8 | $l_0$, 3, 6, 9 |
| 12 | $l_0$ | $l_0$, 11 | — | $l_0$, 7, 11 | — | $l_0$, 5, 8, 11 | — | $l_0$ | $l_0$, 10 | $l_0$, 5, 10 | $l_0$, 3, 6, 9 |
| 13 | $l_0$ | — | — | — | — | — | — | $l_0$ | $l_0$, 10 | $l_0$, 5, 10 | — |
| 14 | $l_0$ | — | — | — | — | — | — | — | — | — | — |

TABLE 6

Time domain position of uplink DMRSs in a case of a double-symbol DMRS

| PUSCH duration in symbols | DM-RS positions $\bar{l}$ | | | | | | | | | |
|---|---|---|---|---|---|---|---|---|---|---|
| | PUSCH mapping type A UL-DMRS-add-pos | | | | | | PUSCH mapping type B UL-DMRS-add-pos | | | |
| | 1 | | 2 | | 3 | | 0 | 1 | 2 | 3 |
| | $l_0 = 2$ | $l_0 = 3$ | $l_0 = 2$ | $l_0 = 3$ | $l_0 = 2$ | $l_0 = 3$ | $l_0 = 0$ | $l_0 = 0$ | $l_0 = 0$ | $l_0 = 0$ |
| ≤6 | $l_0$ | — | — | — | — | — | $l_0$ | — | — | — |
| 7 | $l_0$ | — | $l_0, 8$ | — | — | — | $l_0$ | — | — | — |
| 8 | $l_0$ | $l_0, 8$ | $l_0, 8$ | — | — | — | $l_0$ | $l_0, 5$ | — | — |
| 9 | $l_0$ | $l_0, 8$ | $l_0, 8$ | — | — | — | $l_0$ | $l_0, 5$ | — | — |
| 10 | $l_0$ | $l_0, 8$ | $l_0, 10$ | — | — | — | $l_0$ | $l_0, 7$ | — | — |
| 11 | $l_0$ | $l_0, 10$ | $l_0, 10$ | — | — | — | $l_0$ | $l_0, 7$ | — | — |
| 12 | $l_0$ | $l_0, 10$ | — | — | — | — | $l_0$ | $l_0, 9$ | — | — |
| 13 | $l_0$ | — | — | — | — | — | $l_0$ | $l_0, 9$ | — | — |
| 14 | $l_0$ | — | — | — | — | — | — | — | — | — |

Specifically, a position of a DMRS symbol may be represented by $\bar{l}$, and the quantity of consecutive symbols of the PUSCH is used in both Table 5 and Table 6. In addition, when DL-DMRS-typeA-pos is equal to 2, UL-DMRS-add-pos may be equal to 3. (The position(s) of the DMRS symbols is given by $\bar{l}$ and the duration of the PUSCH transmission in the symbols according to Table 5 and 6. The case UL-DMRS-add-pos equal to 3 is only supported when DL-DMRS-typeA-pos is equal to 2.)

Assuming that the actual quantity of symbols of the front-loaded DMRS is the single-symbol DMRS, the terminal device selects Table 5 and determines that the PUSCH duration in the symbols is 7, the mapping type of the PUSCH is the PUSCH mapping type A, the quantity of additional DMRSs is 1, and $l_0=2$. In this case, the terminal device may select a time domain position being 7 of the additional DMRS from Table 5. A specific DMRS pattern is shown in FIG. 5. Assuming that the actual quantity of symbols of the front-loaded DMRS is the single-symbol DMRS, the terminal device selects Table 5 and determines that the PUSCH duration in the symbols is 7, the mapping type of the PUSCH is the PUSCH mapping type A, the quantity of additional DMRSs is 1, and $l_0=3$. In this case, the terminal device may select a time domain position being 9 of the additional DMRS from Table 5. A specific DMRS pattern is shown in FIG. 6.

It should be understood that, "–" in Table 5 and Table 6 indicates that the configuration is not supported. In a specific implementation, to satisfy a requirement for flexible scheduling, the configuration may be replaced with another DMRS position configuration. For example, only $l_0$ may be included, or a configuration in which a quantity of UL-DMRS-add-pos is decreased by 1 is used, or a DMRS beyond a PUSCH range may be punctured (puncture). For example, in Table 5, when UL-DMRS-add-pos=3 and $l_0=2$, if the PUSCH duration in the symbols=9, corresponding "–" may be separately replaced with "$l_0$", "$l_0, 6, 9$", or "$l_0, 5, 8$" by using the foregoing method. However, this is not limited in this embodiment of this application.

It should be further understood that, Table 5 and Table 6 may be two independent tables, or may be combined into one table, or may be embedded into another table. A specific form of expression of the tables is not limited in this embodiment of this application.

Case Two: Downlink Transmission

The network device sends seventh indication information to the terminal device by using RRC signaling, to indicate an actual quantity of symbols of a front-loaded DMRS. The terminal device receives the RRC signaling, and selects, by using the seventh indication information, Table 7 corresponding to a single-symbol DMRS or Table 8 corresponding to a double-symbol DMRS. Specifically, the network device may configure a maximum quantity of symbols of the front-loaded DMRS by using RRC signaling (DL-DMRS-max-len). When DL-DMRS-max-len=1, the front-loaded DMRS is the single-symbol DMRS; or when DL-DMRS-max-len=2, the network device may further configure the actual quantity of symbols of the front-loaded DMRS by using DCI signaling. The terminal device obtains, based on the RRC signaling or with reference to the RRC signaling and the DCI signaling, the current front-loaded DMRS being the single-symbol DMRS or the double-symbol DMRS, and further determines to select Table 7 corresponding to the single-symbol DMRS or Table 8 corresponding to the double-symbol DMRS.

The network device sends fourth indication information to the terminal device by using DCI. The terminal device receives the DCI, determines, based on the fourth indication information, whether a mapping type of a current PDSCH is a PDSCH mapping type A or a PDSCH mapping type B, and selects a corresponding column from the table. For the mapping type A, time domain positions of DMRSs are defined relative to a start symbol position in a slot. In this case, a position $l_0$ of the first DMRS symbol in time domain may be configured to 2 (the third symbol of the slot) or 3 (the fourth symbol of the slot) by using higher layer signaling DL-DMRS-typeA-pos. For the mapping type B, time domain positions of DMRSs are defined relative to a start symbol position of a resource of a scheduled PUSCH. In this case, a position $l_0$ of the first DMRS symbol in time domain is the first symbol of the PUSCH, and has an index of 0 relative to a time domain position of the PUSCH.

The network device may indicate a quantity of additional DMRSs to the terminal device by using sixth indication information. Specifically, the network device sends DL-DMRS-add-pos by using RRC signaling. The terminal device receives the RRC signaling to obtain the quantity of additional DMRSs, and selects a corresponding column (a DMRS position set) from the table.

The network device may indicate a quantity of consecutive symbols of the PDSCH (PDSCH duration in symbols)

and a start symbol position of the PDSCH to the terminal device by using DCI signaling. The terminal device receives the DCI signaling, to obtain the PDSCH duration in the symbols, and determines the final time domain positions of the DMRSs with reference to a specific value of the position $l_0$ of the front-loaded DMRS. Further, the terminal device may receive, in the position, the DMRSs sent by the network device.

It should be understood that, the foregoing processes are merely examples of descriptions for ease of understanding. In a specific implementation, there may be no specific chronological order between the processes. The terminal device may use a different sequence with reference to the foregoing signaling, provided that the time domain positions of the DMRSs can be determined.

Assuming that the actual quantity of symbols of the front-loaded DMRS is the single-symbol DMRS, the terminal device selects Table 7 and determines that the PUSCH duration in the symbols is 8, the mapping type of the PDSCH is the PDSCH mapping type A, the quantity of additional DMRSs is 2, and $l_0=3$. In this case, the terminal device may select time domain positions being 6 and 9 of the additional DMRSs from Table 7. A specific DMRS pattern is shown in FIG. 7. Assuming that the actual quantity of symbols of the front-loaded DMRS is the single-symbol DMRS, the terminal device selects Table 7 and determines that the PDSCH duration in the symbols is 9, the mapping type of the PDSCH is the PDSCH mapping type A, the quantity of additional DMRSs is 2, and $l_0=3$. In this case, the terminal device may

TABLE 7

Time domain positions of downlink DMRSs in a case of a single-symbol DMRS

| PDSCH duration in symbols | DM-RS positions $\bar{l}$ | | | | | | | | | |
|---|---|---|---|---|---|---|---|---|---|---|
| | PDSCH mapping type A DL-DMRS-add-pos | | | | | | PDSCH mapping type B DL-DMRS-add-pos | | | |
| | 1 | | 2 | | 3 | | 0 | 1 | 2 | 3 |
| | $l_0=2$ | $l_0=3$ | $l_0=2$ | $l_0=3$ | $l_0=2$ | $l_0=3$ | $l_0=0$ | $l_0=0$ | $l_0=0$ | $l_0=0$ |
| ≤4 | $l_0$ | — | — | — | — | — | $l_0$ | — | — | — |
| 5 | $l_0$ | — | — | — | — | — | $l_0$ | — | — | — |
| 6 | $l_0$ | — | $l_0$, 7 | — | — | — | $l_0$ | — | — | — |
| 7 | $l_0$ | $l_0$, 7 | $l_0$, 9 | — | $l_0$, 6, 9 | — | $l_0$ | $l_0$, 4 | — | — |
| 8 | $l_0$ | $l_0$, 9 | $l_0$, 9 | $l_0$, 6, 9 | $l_0$, 6, 9 | — | $l_0$ | — | — | — |
| 9 | $l_0$ | $l_0$, 9 | $l_0$, 9 | $l_0$, 6, 9 | $l_0$, 6, 9 | — | $l_0$ | — | — | — |
| 10 | $l_0$ | $l_0$, 9 | $l_0$, 11 | $l_0$, 6, 9 | $l_0$, 7, 11 | $l_0$, 5, 8, 11 | $l_0$ | — | — | — |
| 11 | $l_0$ | $l_0$, 11 | $l_0$, 11 | $l_0$, 7, 11 | $l_0$, 7, 11 | $l_0$, 5, 8, 11 | $l_0$ | — | — | — |
| 12 | $l_0$ | $l_0$, 11 | — | $l_0$, 7, 11 | — | $l_0$, 5, 8, 11 | $l_0$ | — | — | — |
| 13 | $l_0$ | — | — | — | — | — | $l_0$ | — | — | — |
| 14 | $l_0$ | — | — | — | — | — | $l_0$ | — | — | — |

TABLE 8

Time domain positions of downlink DMRSs in a case of a double-symbol DMRS

| PDSCH duration in symbols | DM-RS positions $\bar{l}$ | | | | | | | | | |
|---|---|---|---|---|---|---|---|---|---|---|
| | PDSCH mapping type A DL-DMRS-add-pos | | | | | | PDSCH mapping type B DL-DMRS-add-pos | | | |
| | 1 | | 2 | | 3 | | 0 | 1 | 2 | 3 |
| | $l_0=2$ | $l_0=3$ | $l_0=2$ | $l_0=3$ | $l_0=2$ | $l_0=3$ | $l_0=0$ | $l_0=0$ | $l_0=0$ | $l_0=0$ |
| ≤6 | $l_0$ | — | — | — | — | — | $l_0$ | — | — | — |
| 7 | $l_0$ | — | $l_0$, 8 | — | — | — | $l_0$ | $l_0$, 4 | — | — |
| 8 | $l_0$ | $l_0$, 8 | $l_0$, 8 | — | — | — | $l_0$ | — | — | — |
| 9 | $l_0$ | $l_0$, 8 | $l_0$, 8 | — | — | — | $l_0$ | — | — | — |
| 10 | $l_0$ | $l_0$, 8 | $l_0$, 10 | — | — | — | $l_0$ | — | — | — |
| 11 | $l_0$ | $l_0$, 10 | $l_0$, 10 | — | — | — | $l_0$ | — | — | — |
| 12 | $l_0$ | $l_0$, 10 | — | — | — | — | $l_0$ | — | — | — |
| 13 | $l_0$ | — | — | — | — | — | $l_0$ | — | — | — |
| 14 | $l_0$ | — | — | — | — | — | $l_0$ | — | — | — |

Specifically, a position of DMRS symbols may be represented by $\bar{l}$, and the quantity of consecutive symbols of the PDSCH is used in both Table 7 and Table 8. In addition, when DL-DMRS-typeA-pos is equal to 2, DL-DMRS-add-pos may be equal to 3. (The position(s) of the DMRS symbols is given by $\bar{l}$ and duration of PDSCH transmission in symbols to Tables 7 and 8. The case DL-DMRS-add-pos equal to 3 is only supported when DL-DMRS-typeA-pos is equal to 2.)

select time domain positions being 6 and 9 of the additional DMRSs from Table 8. A specific DMRS pattern is shown in FIG. 8.

It should be understood that, "—" in Table 7 and Table 8 indicate that the configuration is not supported, and in a specific implementation, may be processed in a manner similar to that in Table 5 and Table 6. It should be further understood that, Table 7 and Table 8 may be two independent tables, or may be combined into one table, or may be embedded into another table. Table 5 to Table 8 may alternatively be combined into one table. A specific form of expression of the tables is not limited in this embodiment of this application.

The resource indication method in the embodiments of this application is described in detail above with reference to FIG. 1 to FIG. 8, and a terminal device and a network device in the embodiments of this application are described in detail below with reference to FIG. 9 to FIG. 14.

Figure 9:
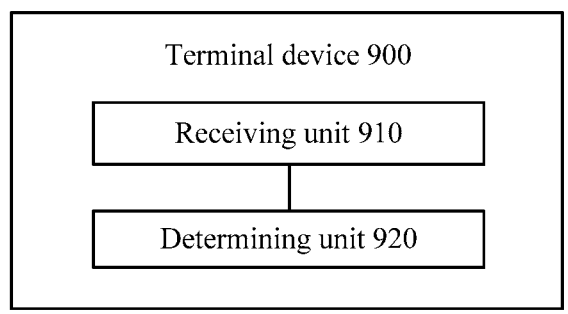
FIG. 9 is a schematic block diagram of a terminal device according to an embodiment of this application.

FIG. 9 shows a terminal device 900 according to an embodiment of this application. The terminal device 900 includes:

a receiving unit 910, configured to receive first indication information sent by a network device, where the first indication information is used to indicate a mapping type of a physical shared channel, and the mapping type of the physical shared channel is a first type or a second type; and a determining unit 920, configured to determine time domain positions occupied by DMRSs in a resource unit based on the mapping type of the physical shared channel and with reference to a position index of the last symbol occupied by the physical shared channel in the resource unit or a quantity of symbols occupied by the physical shared channel in the resource unit, where the position index of the last symbol occupied by the physical shared channel in the resource unit corresponds to the first type, and the quantity of symbols occupied by the physical shared channel in the resource unit corresponds to the second type.

Optionally, the DMRSs include a first DMRS and an additional DMRS. The determining unit 920 is specifically configured to determine a time domain position occupied by the additional DMRS in the resource unit based on the mapping type of the physical shared channel and with reference to the position index of the last symbol occupied by the physical shared channel in the resource unit or the quantity of symbols occupied by the physical shared channel in the resource unit.

Optionally, the mapping type of the physical shared channel is the first type. The determining unit 920 is specifically configured to determine the time domain position occupied by the additional DMRS in the resource unit based on at least the position index of the last symbol occupied by the physical shared channel in the resource unit and a first mapping relationship, where the first mapping relationship is used to indicate a correspondence between different position indexes of the last symbols of physical shared channels in the resource unit and different time domain positions occupied by additional DMRSs in the resource unit.

Optionally, the mapping type of the physical shared channel is the second type. The determining unit 920 is specifically configured to determine the time domain position occupied by the additional DMRS in the resource unit based on at least the quantity of symbols occupied by the physical shared channel in the resource unit and a second mapping relationship, where the second mapping relationship is used to indicate a correspondence between different quantities of symbols occupied by physical shared channels in the resource unit and different time domain positions occupied by additional DMRSs in the resource unit.

Optionally, the receiving unit 910 is further configured to: before the time domain position occupied by the additional DMRS in the resource unit is determined, receive second indication information sent by the network device, where the second indication information is used to indicate a quantity of additional DMRSs; and receive third indication information sent by the network device, where the third indication information is used to indicate an actual quantity of symbols occupied by the first DMRS in the resource unit. The determining unit 920 is specifically configured to determine the time domain position occupied by the additional DMRS in the resource unit based on the mapping type of the physical shared channel, the quantity of additional DMRSs, and the actual quantity of symbols occupied by the first DMRS in the resource unit and with reference to the position index of the last symbol occupied by the physical shared channel in the resource unit or the quantity of symbols occupied by the physical shared channel in the resource unit.

It should be understood that the terminal device 900 herein is presented in a form of functional units. The term "unit" herein may refer to an application-specific integrated circuit (ASIC), an electronic circuit, a processor (for example, a shared processor, a proprietary processor, or a packet processor) configured to perform one or more software or firmware programs, a combined logic circuit, and/or another appropriate component supporting the described function. In an optional example, a person skilled in the art may understand that the terminal device 900 may be specifically the terminal device in the foregoing embodiments. The terminal device 900 may be configured to perform each procedure and/or step corresponding to the terminal device in the foregoing method embodiment 300. To avoid repetition, details are not described herein again.

In a possible implementation, the receiving unit 910 is further configured to receive demodulation reference signal (DMRS) configuration information, where the DMRS configuration information includes time domain positions of the DMRSs in different mapping types of the DMRSs, the mapping type of the physical shared channel is the first type or the second type, DMRS configuration information corresponding to the first type includes the position index of the last symbol occupied by the physical shared channel in the resource unit, and DMRS configuration information corresponding to the second type includes the quantity of symbols occupied by the physical shared channel in the resource unit. The terminal device 900 further includes a storage unit, configured to store the DMRS configuration information.

Figure 10:
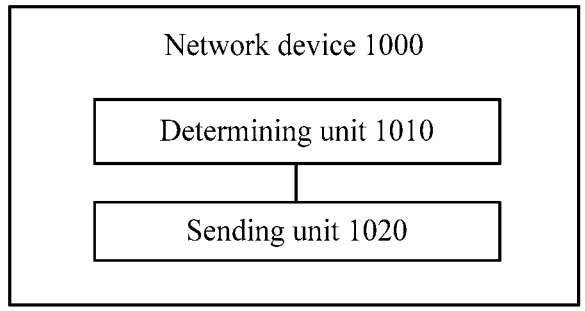
FIG. 10 is a schematic block diagram of a network device according to an embodiment of this application.

FIG. 10 shows a network device 1000 according to an embodiment of this application. The network device 1000 includes:

a determining unit 1010, configured to determine first indication information, where the first indication information is used to indicate a mapping type of a physical shared channel of demodulation reference signals, and the mapping type of the physical shared channel is a first type or a second type; and a sending unit 1020, configured to send the first indication information to a terminal device, where a position index of the last symbol occupied by the physical shared channel in a resource unit corresponds to the first type, and a quantity of symbols occupied by the physical shared channel in the resource unit corresponds to the second type.

Optionally, the DMRSs include a first DMRS and an additional DMRS. The sending unit 1020 is further configured to: send second indication information to the terminal device, where the second indication information is used to indicate a quantity of additional DMRSs; and send third indication information to the terminal device, where the third indication information is used to indicate an actual quantity of symbols occupied by the first DMRS in the resource unit.

It should be understood that the network device 1000 herein is presented in a form of functional units. The term "unit" herein may refer to an application-specific integrated circuit (ASIC), an electronic circuit, a processor (for example, a shared processor, a proprietary processor, or a packet processor) configured to perform one or more software or firmware programs, a combined logic circuit, and/or another appropriate component supporting the described function. In an optional example, a person skilled in the art may understand that the network device 1000 may be specifically the network device in the foregoing embodiments. The network device 1000 may be configured to perform each procedure and/or step corresponding to the network device in the foregoing method embodiment 300. To avoid repetition, details are not described herein again.

In a possible implementation, the network device further includes: a receiving unit, configured to receive demodulation reference signal (DMRS) configuration information, where the DMRS configuration information includes time domain positions of the DMRSs in different mapping types of the DMRSs, the mapping type of the physical shared channel is the first type or the second type, DMRS configuration information corresponding to the first type includes the position index of the last symbol occupied by the physical shared channel in the resource unit, and DMRS configuration information corresponding to the second type includes the quantity of symbols occupied by the physical shared channel in the resource unit; and a storage unit, configured to store the DMRS configuration information.

Figure 11:
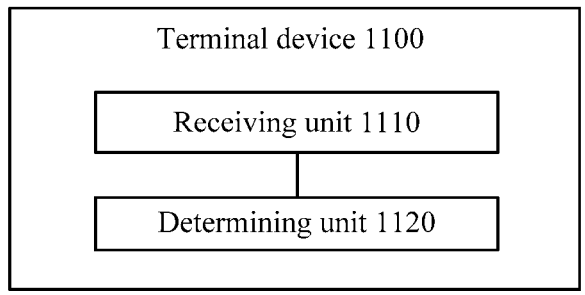
FIG. 11 is a schematic block diagram of another terminal device according to an embodiment of this application.

FIG. 11 shows another terminal device 1100 according to an embodiment of this application. The terminal device 1100 includes:

a receiving unit 1110, configured to receive fourth indication information sent by a network device, where the fourth indication information is used to indicate a mapping type of a physical shared channel of demodulation reference signals and a quantity of symbols occupied by the physical shared channel in a resource unit, and the mapping type of the physical shared channel is a first type or a second type; and a determining unit 1120, configured to determine a time domain position occupied by an additional DMRS in the DMRSs in the resource unit based on the mapping type of the physical shared channel, the quantity of symbols occupied by the physical shared channel in the resource unit, and a time domain position occupied by a first DMRS in the DMRSs in the resource unit.

Optionally, the receiving unit 1110 is further configured to: before the time domain position occupied by the additional DMRS in the DMRSs in the resource unit is determined, receive fifth indication information sent by the network device, where the fifth indication information is used to indicate the time domain position occupied by the first DMRS in the resource unit.

Optionally, the mapping type of the physical shared channel is the first type. The determining unit 1120 is specifically configured to determine the time domain position occupied by the additional DMRS in the resource unit based on the quantity of symbols occupied by the physical shared channel in the resource unit, the time domain position occupied by the first DMRS in the resource unit, and a third mapping relationship, where the third mapping relationship is used to indicate a correspondence between different quantities of symbols occupied by physical shared channels in the resource unit, different time domain positions occupied by the first DMRSs in the resource unit, and different time domain positions occupied by additional DMRSs in the resource unit.

Optionally, the mapping type of the physical shared channel is the second type. The determining unit 1120 is specifically configured to determine the time domain position occupied by the additional DMRS in the resource unit based on the quantity of symbols occupied by the physical shared channel in the resource unit, the time domain position occupied by the first DMRS in the resource unit, and a fourth mapping relationship, where the fourth mapping relationship is used to indicate a correspondence between different quantities of symbols occupied by physical shared channels in the resource unit, different time domain positions occupied by the first DMRSs in the resource unit, and different time domain positions occupied by additional DMRSs in the resource unit.

Optionally, the receiving unit 1110 is further configured to: before the time domain position occupied by the additional DMRS in the DMRSs in the resource unit is determined, receive sixth indication information sent by the network device, where the sixth indication information is used to indicate a quantity of additional DMRSs; and receive seventh indication information sent by the network device, where the seventh indication information is used to indicate an actual quantity of symbols occupied by the first DMRS in the resource unit. The determining unit 1120 is specifically configured to determine the time domain position occupied by the additional DMRS in the resource unit based on the mapping type of the physical shared channel, the quantity of symbols occupied by the physical shared channel in the resource unit, the time domain position occupied by the first DMRS in the resource unit, the quantity of additional DMRSs, and the actual quantity of symbols occupied by the first DMRS in the resource unit.

It should be understood that the terminal device 1100 herein is presented in a form of functional units. The term "unit" herein may refer to an application-specific integrated circuit (ASIC), an electronic circuit, a processor (for example, a shared processor, a proprietary processor, or a packet processor) configured to perform one or more software or firmware programs, a combined logic circuit, and/or another appropriate component supporting the described function. In an optional example, a person skilled in the art may understand that the terminal device 1100 may be specifically the terminal device in the foregoing embodiments. The terminal device 1100 may be configured to perform each procedure and/or step corresponding to the terminal device in the foregoing method embodiment 400. To avoid repetition, details are not described herein again.

In a possible implementation, the receiving unit 1110 is further configured to receive demodulation reference signal (DMRS) configuration information of a, where the DMRSs include the first DMRS and the additional DMRS, the DMRS configuration information includes time domain positions that are of additional DMRSs and that correspond to different time domain positions of the first DMRSs in different mapping types of the physical shared channel, and the mapping types of the physical shared channel include the first type and the second type. The terminal device 1100 further includes a storage unit, configured to store the DMRS configuration information.

Figure 12:
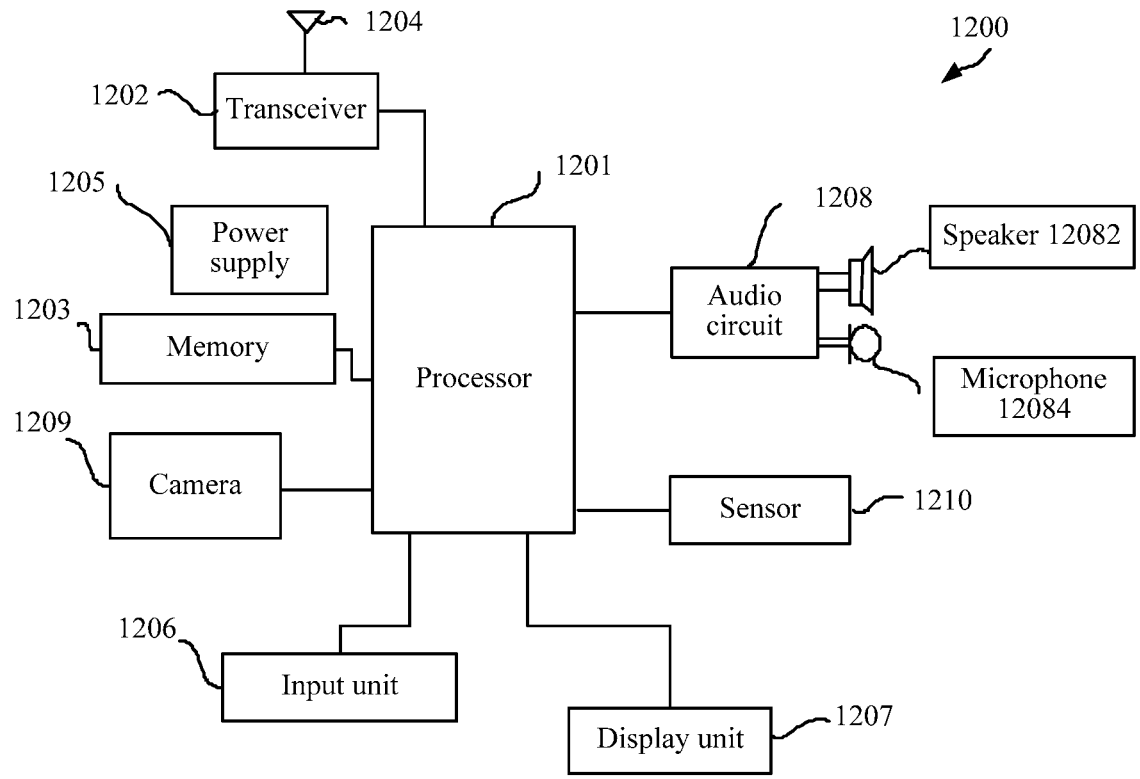
FIG. 12 is a schematic block diagram of another terminal device according to an embodiment of this application.

FIG. 12 shows another terminal device 1200 according to an embodiment of this application. The terminal device 1200 includes a processor 1201, a transceiver 1202, and a memory 1203. The processor 1201, the transceiver 1202, and the memory 1203 communicate with one another through an internal connection path. The memory 1203 is configured to store an instruction. The processor 1201 is configured to execute the instruction stored in the memory 1203, to control the transceiver 1202 to send a signal and/or receive a signal.

When the program instruction stored in the memory 1203 is executed by the processor 1201, the processor 1201 is configured to: receive, by using the transceiver 1202, first indication information sent by a network device, where the first indication information is used to indicate a mapping type of a physical shared channel, and the mapping type of the physical shared channel is a first type or a second type; and determine time domain positions occupied by DMRSs in a resource unit based on the mapping type of the physical shared channel and with reference to a position index of the last symbol occupied by the physical shared channel in the resource unit or a quantity of symbols occupied by the physical shared channel in the resource unit, where the position index of the last symbol occupied by the physical shared channel in the resource unit corresponds to the first type, and the quantity of symbols occupied by the physical shared channel in the resource unit corresponds to the second type.

Alternatively, the memory 1203 stores DMRS configuration information, where the DMRS configuration information includes time domain positions of DMRSs in different mapping types of the DMRSs, the mapping type of the physical shared channel is a first type or a second type, DMRS configuration information corresponding to the first type includes a position index of the last symbol occupied by the physical shared channel in a resource unit, and DMRS configuration information corresponding to the second type includes a quantity of symbols occupied by the physical shared channel in the resource unit.

The processor 1201 and the memory 1203 may be combined into one processing apparatus, and the processor 1201 is configured to execute program code stored in the memory 1203, to implement the foregoing functions. In a specific implementation, the memory 1203 may alternatively be integrated into the processor 1201 or independent of the processor 1201. The terminal device 1200 may further include an antenna 1204, configured to send, by using a radio signal, uplink data or uplink control signaling that is output by the transceiver 1202.

It should be understood that the terminal device 1200 may be specifically the terminal device in the foregoing embodiment 300, and may be configured to perform each step and/or procedure corresponding to the terminal device in the foregoing method embodiment 300. Optionally, the memory 1203 may include a read-only memory and a random access memory, and provide an instruction and data to the processor. A part of the memory may further include a non-volatile random access memory. For example, the memory may further store information about a device type. The processor 1201 may be configured to execute the instruction stored in the memory, and when the processor 1201 executes the instruction stored in the memory, the processor 1201 is configured to perform each step and/or procedure corresponding to the terminal device in the foregoing method embodiment.

The processor 1201 may be configured to perform an action that is implemented inside the terminal and that is described in the foregoing method embodiment, and the transceiver 1202 may be configured to perform an action of receiving from the network device by the terminal that is described in the foregoing method embodiment. For details, refer to the descriptions in the foregoing method embodiment, and details are not described herein again.

The terminal device 1200 may further include a power supply 1205, configured to provide a power source for various components or circuits in the terminal device 1200.

In addition, to make functions of the terminal device more perfect, the terminal device 1200 may further include one or more of an input unit 1206, a display unit 1207, an audio circuit 1208, a camera 1209, and a sensor 1210. The audio circuit may further include a speaker 12082, a microphone 12084, and the like.

Figure 13:
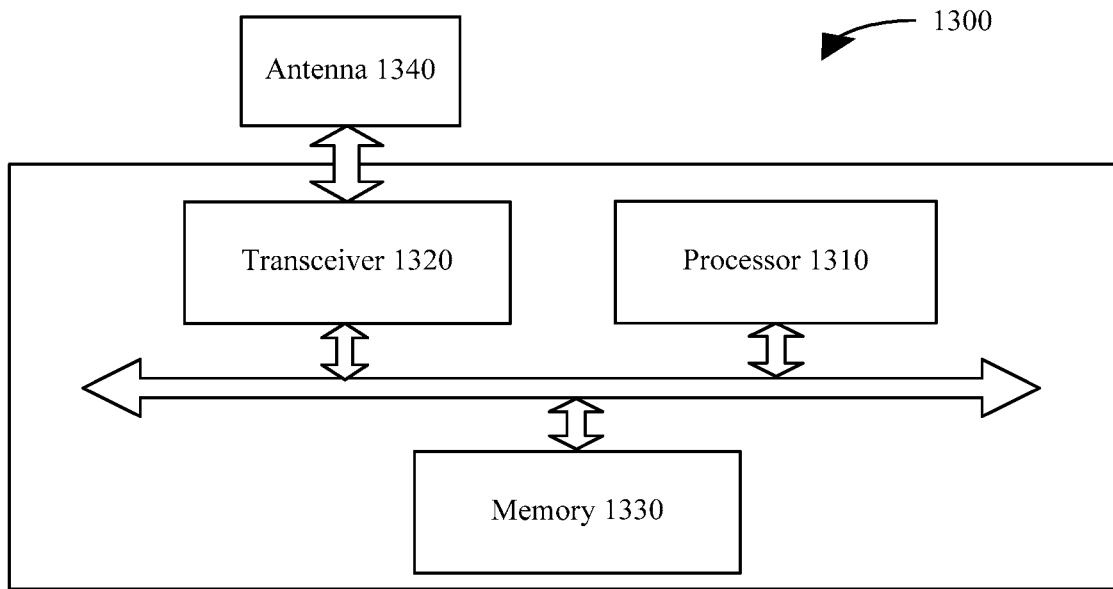
FIG. 13 is a schematic block diagram of another network device according to an embodiment of this application.

FIG. 13 shows another network device 1300 according to an embodiment of this application. The network device 1300 includes a processor 1310, a transceiver 1320, and a memory 1330. The processor 1310, the transceiver 1320, and the memory 1330 communicate with one another through an internal connection path. The memory 1330 is configured to store an instruction. The processor 1310 is configured to execute the instruction stored in the memory 1330, to control the transceiver 1320 to send a signal and/or receive a signal.

When the program instruction stored in the memory 1330 is executed by the processor 1310, the processor 1310 is configured to: determine first indication information, where the first indication information is used to indicate a mapping type of a physical shared channel of demodulation reference signals, and the mapping type of the physical shared channel is a first type or a second type; and send the first indication information to a terminal device by using the transceiver 1320, where a position index of the last symbol occupied by the physical shared channel in a resource unit corresponds to the first type, and a quantity of symbols occupied by the physical shared channel in the resource unit corresponds to the second type.

Alternatively, the memory 1330 stores DMRS configuration information, where the DMRS configuration information includes time domain positions of DMRSs in different mapping types of the DMRSs, the mapping type of the physical shared channel is a first type or a second type, DMRS configuration information corresponding to the first type includes a position index of the last symbol occupied by the physical shared channel in a resource unit, and DMRS configuration information corresponding to the second type includes a quantity of symbols occupied by the physical shared channel in the resource unit.

The processor 1310 and the memory 1330 may be combined into one processing apparatus, and the processor 1310 is configured to execute program code stored in the memory 1330, to implement the foregoing functions. In a specific implementation, the memory 1330 may alternatively be integrated into the processor 1310 or independent of the processor 1310.

The network device 1300 may further include an antenna 1340, configured to send, by using a radio signal, downlink data or downlink control signaling that is output by the transceiver 1320. It should be understood that the network device 1300 may be specifically the network device in the foregoing embodiment 300, and may be configured to perform each step and/or procedure corresponding to the network device in the foregoing method embodiment 300. Optionally, the memory 1330 may include a read-only memory and a random access memory, and provide an instruction and data to the processor. A part of the memory may further include a non-volatile random access memory. For example, the memory may further store information about a device type. The processor 1310 may be configured to execute the instruction stored in the memory, and when the processor 1310 executes the instruction stored in the memory, the processor 1310 is configured to perform each step and/or procedure corresponding to the network device in the foregoing method embodiment.

Figure 14:
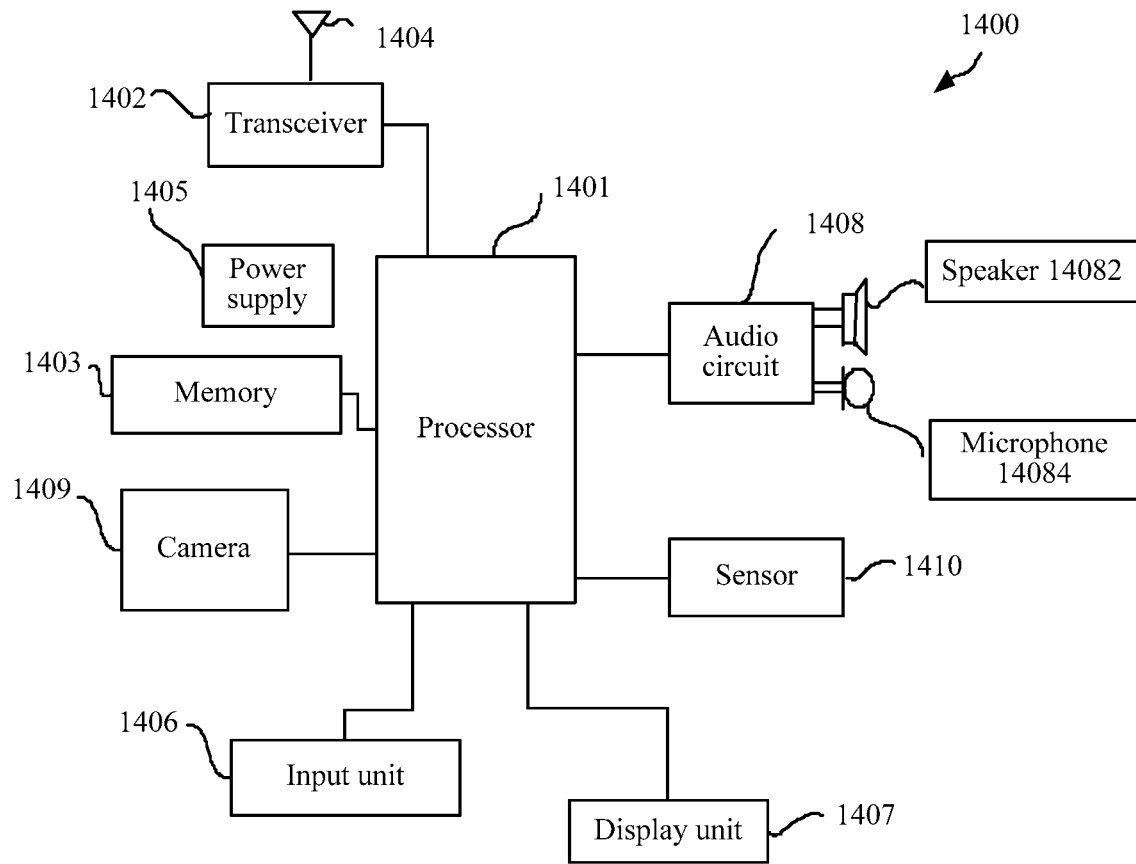
FIG. 14 is a schematic block diagram of another terminal device according to an embodiment of this application.

FIG. 14 shows another terminal device 1400 according to an embodiment of this application. The terminal device 1400 includes a processor 1401, a transceiver 1402, and a memory 1403. The processor 1401, the transceiver 1402, and the memory 1403 communicate with one another through an internal connection path. The memory 1403 is configured to store an instruction. The processor 1401 is configured to execute the instruction stored in the memory 1403, to control the transceiver 1402 to send a signal and/or receive a signal.

When the program instruction stored in the memory 1403 is executed by the processor 1401, the processor 1401 is configured to: receive, by using the transceiver 1402, fourth indication information sent by a network device, where the fourth indication information is used to indicate a mapping type of a physical shared channel of demodulation reference signals and a quantity of symbols occupied by the physical shared channel in a resource unit, and the mapping type of the physical shared channel is a first type or a second type; and determine a time domain position occupied by an additional DMRS in the DMRSs in the resource unit based on the mapping type of the physical shared channel, the quantity of symbols occupied by the physical shared channel in the resource unit, and a time domain position occupied by a first DMRS in the DMRSs in the resource unit.

Alternatively, the memory 1330 store DMRS configuration information, wherein DMRSs include a first DMRS and an additional DMRS, the DMRS configuration information includes time domain positions that are of additional DMRSs and that correspond to different time domain positions of the first DMRSs in different mapping types of a physical shared channel, and the mapping types of the physical shared channel include a first type and a second type.

The processor 1401 and the memory 1403 may be combined into one processing apparatus, and the processor 1401 is configured to execute program code stored in the memory 1403, to implement the foregoing functions. In a specific implementation, the memory 1403 may alternatively be integrated into the processor 1401 or independent of the processor 1401. The terminal device 1400 may further include an antenna 1404, configured to send, by using a radio signal, uplink data or uplink control signaling that is output by the transceiver 1402.

It should be understood that the terminal device 1400 may be specifically the terminal device in the foregoing embodiment 300, and may be configured to perform each step and/or procedure corresponding to the terminal device in the foregoing method embodiment 300. Optionally, the memory 1403 may include a read-only memory and a random access memory, and provide an instruction and data to the processor. A part of the memory may further include a non-volatile random access memory. For example, the memory may further store information about a device type. The processor 1401 may be configured to execute the instruction stored in the memory, and when the processor 1401 executes the instruction stored in the memory, the processor 1401 is configured to perform each step and/or procedure corresponding to the terminal device in the foregoing method embodiment.

The processor 1401 may be configured to perform an action that is implemented inside the terminal and that is described in the foregoing method embodiment, and the transceiver 1402 may be configured to perform an action of transmission or sending from the terminal to the terminal device that is described in the foregoing method embodiment. For details, refer to the descriptions in the foregoing method embodiment, and details are not described herein again.

The terminal device 1400 may further include a power supply 1405, configured to provide a power source for various components or circuits in the terminal device 1400.

In addition, to make functions of the terminal device more perfect, the terminal device 1400 may further include one or more of an input unit 1406, a display unit 1407, an audio circuit 1408, a camera 1409, and a sensor 1410. The audio circuit may further include a speaker 14082, a microphone 14084, and the like.

It should be understood that in the embodiments of this application, the processor in the foregoing network device and terminal device may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

In an implementation process, steps in the foregoing methods may be implemented by using a hardware integrated logic circuit in the processor, or by using instructions in a form of software. The steps of the methods disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes the instructions in the memory and completes the steps in the foregoing methods in combination with the hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, the steps of the methods and the units described with reference to the embodiments disclosed in this specification may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A resource indication method, comprising:
   receiving first indication information from a network device, wherein the first indication information indicates a mapping type of a physical shared channel, wherein the mapping type of the physical shared channel is a first type or a second type, the first type comprises physical downlink shared channel (PDSCH) mapping type A or physical uplink shared channel (PUSCH) mapping type A, and the second type comprises PDSCH mapping type B or PUSCH mapping type B; and
   determining time domain positions occupied by a demodulation reference signal (DMRS) in a resource unit based on the mapping type of the physical shared channel, wherein, under different mapping types, the time domain positions occupied by the DMRS in the resource unit are determined based on different parameters in a manner comprising:
      in response to that the mapping type of the physical shared channel is the first type, the time domain positions occupied by the DMRS in the resource unit are determined based on a position index of a last symbol occupied by the physical shared channel in the resource unit; and
      in response to that the mapping type of the physical shared channel is the second type, the time domain positions occupied by the DMRS in the resource unit are determined based on a quantity of symbols occupied by the physical shared channel in the resource unit.

2. The method according to claim 1, wherein the DMRS comprises a first DMRS and an additional DMRS; and
   wherein, under different mapping types, the time domain positions occupied by the DMRS in the resource unit are determined based on different parameters in a manner comprising:
      in response to that the mapping type of the physical shared channel is the first type, a time domain position occupied by the additional DMRS in the resource unit is determined based on the position index of the last symbol occupied by the physical shared channel in the resource unit; and
      in response to that the mapping type of the physical shared channel is the second type, the time domain position occupied by the additional DMRS in the resource unit is determined based on the quantity of symbols occupied by the physical shared channel in the resource unit.

3. The method according to claim 2, wherein the mapping type of the physical shared channel is the first type; and
   the time domain position occupied by the additional DMRS in the resource unit is determined based on at least the position index of the last symbol occupied by the physical shared channel in the resource unit and a first mapping relationship, wherein the first mapping relationship indicates a correspondence between the position index of the last symbol occupied by the physical shared channel in the resource unit and the time domain position occupied by the additional DMRS in the resource unit.

4. The method according to claim 2, wherein the mapping type of the physical shared channel is the second type; and
   the time domain position occupied by the additional DMRS in the resource unit is determined based on at least the quantity of symbols occupied by the physical shared channel in the resource unit and a second mapping relationship, wherein the second mapping relationship indicates a correspondence between a quantity of symbols occupied by the physical shared channel in the resource unit and the time domain position occupied by the additional DMRS in the resource unit.

5. The method according to claim 2, wherein before the time domain position occupied by the additional DMRS in the resource unit is determined, the method further comprises:

receiving second indication information from the network device, wherein the second indication information indicates a quantity of additional DMRS; and receiving third indication information from the network device, wherein the third indication information indicates an actual quantity of symbols occupied by the first DMRS in the resource unit;

wherein:

in response to that the mapping type of the physical shared channel is the first type, the time domain position occupied by the additional DMRS in the resource unit is determined based on the quantity of additional DMRS, and the actual quantity of symbols occupied by the first DMRS in the resource unit and the position index of the last symbol occupied by the physical shared channel in the resource unit; and in response to that the mapping type of the physical shared channel is the second type, the time domain position occupied by the additional DMRS in the resource unit is determined based on the quantity of additional DMRS, and the actual quantity of symbols occupied by the first DMRS in the resource unit and the quantity of symbols occupied by the physical shared channel in the resource unit.

6. A resource indication method, comprising:

transmitting first indication information to a terminal device, wherein the first indication information indicates a mapping type of a physical shared channel, wherein the mapping type of the physical shared channel is a first type or a second type, the first type comprises PDSCH mapping type A or PUSCH mapping type A, and the second type comprises PDSCH mapping type B or PUSCH mapping type B;

determining time domain positions occupied by a demodulation reference signal (DMRS) in a resource unit based on the mapping type of the physical shared channel; and transmitting the DMRS to the terminal device according to the time domain positions, wherein:

under different mapping types, the time domain positions occupied by the DMRS in the resource unit are determined based on different parameters in a manner comprising:

in response to that the mapping type of the physical shared channel is the first type, the time domain positions occupied by the DMRS in the resource unit are determined based on a position index of a last symbol occupied by the physical shared channel in the resource unit; and in response to that the mapping type of the physical shared channel is the second type, the time domain positions occupied by the DMRS in the resource unit are determined based on a quantity of symbols occupied by the physical shared channel in the resource unit.

7. The method according to claim 6, wherein the DMRS comprises a first DMRS and an additional DMRS, and the method further comprises:

transmitting second indication information to the terminal device, wherein the second indication information indicates a quantity of additional DMRS; and transmitting third indication information to the terminal device, wherein the third indication information indicates an actual quantity of symbols occupied by the first DMRS in the resource unit.

8. The method according to claim 7, wherein the time domain positions occupied by the DMRS are determined according to DMRS configuration information, wherein the DMRS configuration information comprises a time domain position of the additional DMRS under a specified mapping type of a specified physical shared channel.

9. The method according to claim 8, wherein the DMRS configuration information comprises a first mapping relationship, wherein the first mapping relationship indicates a correspondence between the position index of the last symbol occupied by the physical shared channel in the resource unit and a time domain position occupied by the additional DMRS in the resource unit.

10. The method according to claim 8, wherein the DMRS configuration information comprises a second mapping relationship, wherein the second mapping relationship indicates a correspondence between a quantity of symbols occupied by the physical shared channel in the resource unit and a time domain position occupied by the additional DMRS in the resource unit.

11. The method according to claim 7, wherein the first indication information indicates the first type, and a time domain position of the first DMRS corresponds to a third symbol or a fourth symbol in a slot.

12. The method according to claim 7, wherein the first indication information indicates the second type, and the method further comprises:

indicating a time domain position of the first DMRS, wherein a time domain position of the first DMRS is a first symbol occupied by the physical shared channel in a slot.

13. A communication apparatus, comprising:

at least one processor coupled to at least one non-transitory computer-readable storage medium storing programming instructions for execution by the at least one processor, wherein the programming instructions cause the communication apparatus to implement operations comprising:

receiving first indication information from a network device, wherein the first indication information indicates a mapping type of a physical shared channel, wherein the mapping type of the physical shared channel is a first type or a second type, wherein the first type comprises PDSCH mapping type A or PUSCH mapping type A, and the second type comprises PDSCH mapping type B or PUSCH mapping type B; and determining time domain positions occupied by a demodulation reference signal (DMRS) in a resource unit based on the mapping type of the physical shared channel, wherein, under different mapping types, the time domain positions occupied by the DMRS in the resource unit are determined based on different parameters in a manner comprising:

in response to that the mapping type of the physical shared channel is the first type, the time domain positions occupied by the DMRS in the resource unit are determined based on a position index of a last symbol occupied by the physical shared channel in the resource unit; and in response to that the mapping type of the physical shared channel is the second type, the time domain positions occupied by the DMRS in the resource unit are determined based on a quantity of symbols occupied by the physical shared channel in the resource unit.

14. The communication apparatus according to claim 13, wherein the DMRS comprises a first DMRS and an additional DMRS; and the operations comprise:

in response to that the mapping type of the physical shared channel is the first type, determining a time domain position occupied by the additional DMRS in the resource unit based on the position index of the last symbol occupied by the physical shared channel in the resource unit; and in response to that the mapping type of the physical shared channel is the second type, determining the time domain position occupied by the additional DMRS in the resource unit based on the quantity of symbols occupied by the physical shared channel in the resource unit.

15. The communication apparatus according to claim 14, wherein the mapping type of the physical shared channel is the first type; and the operations comprise:

determining the time domain position occupied by the additional DMRS in the resource unit based on at least the position index of the last symbol occupied by the physical shared channel in the resource unit and a first mapping relationship, wherein the first mapping relationship indicates a correspondence between the position index of the last symbol of the physical shared channel in the resource unit and the time domain position occupied by the additional DMRS in the resource unit.

16. The communication apparatus according to claim 14, wherein the mapping type of the physical shared channel is the second type; and the operations comprise:

determining the time domain position occupied by the additional DMRS in the resource unit based on at least the quantity of symbols occupied by the physical shared channel in the resource unit and a second mapping relationship, wherein the second mapping relationship indicates a correspondence between a quantity of symbols occupied by the physical shared channel in the resource unit and the time domain position occupied by the additional DMRS in the resource unit.

17. The communication apparatus according to claim 14, wherein the operations comprise:

before the time domain position occupied by the additional DMRS in the resource unit is determined, receiving second indication information from the network device, wherein the second indication information indicates a quantity of additional DMRS; and receiving third indication information from the network device, wherein the third indication information indicates an actual quantity of symbols occupied by the first DMRS in the resource unit; and wherein:

in response to that the mapping type of the physical shared channel is the first type, the time domain position occupied by the additional DMRS in the resource unit is determined based on the quantity of additional DMRS, and the actual quantity of symbols occupied by the first DMRS in the resource unit and the position index of the last symbol occupied by the physical shared channel in the resource unit, and in response to that the mapping type of the physical shared channel is the second type, the time domain position occupied by the additional DMRS in the resource unit is determined based on the quantity of additional DMRS, and the actual quantity of symbols occupied by the first DMRS in the resource unit and the quantity of symbols occupied by the physical shared channel in the resource unit.

18. The communication apparatus according to claim 13, wherein the communication apparatus is a terminal device or a chip.

19. A communication apparatus, comprising:

at least one processor coupled to at least one non-transitory computer-readable storage medium storing programming instructions for execution by the at least one processor, wherein the programming instructions cause the communication apparatus to implement operations comprising:

transmitting first indication information to a terminal device, wherein the first indication information indicates a mapping type of a physical shared channel, wherein the mapping type of the physical shared channel is a first type or a second type, the first type comprises PDSCH mapping type A or PUSCH mapping type A, and the second type comprises PDSCH mapping type B or PUSCH mapping type B;

determining time domain positions occupied by a demodulation reference signal (DMRS) in a resource unit based on the mapping type of the physical shared channel; and transmitting the DMRS to the terminal device according to the time domain positions, wherein:

under different mapping types, the time domain positions occupied by the DMRS in the resource unit are determined based on different parameters in a manner comprising:

in response to that the mapping type of the physical shared channel is the first type, the time domain positions occupied by the DMRS in the resource unit are determined based on a position index of a last symbol occupied by the physical shared channel in the resource unit; and in response to that the mapping type of the physical shared channel is the second type, the time domain positions occupied by the DMRS in the resource unit are determined based on a quantity of symbols occupied by the physical shared channel in the resource unit.

20. The communication apparatus according to claim 19, wherein the DMRS comprises a first DMRS and an additional DMRS, and the operations comprise:

transmitting second indication information to the terminal device, wherein the second indication information indicates a quantity of additional DMRS; and transmitting third indication information to the terminal device, wherein the third indication information indicates an actual quantity of symbols occupied by the first DMRS in the resource unit.

21. The communication apparatus according to claim 20, wherein the time domain positions occupied by the DMRS are determined according to DMRS configuration information, wherein the DMRS configuration information comprises a time domain position of the additional DMRS under a specified mapping type of a specified physical shared channel.

22. The communication apparatus according to claim 21, wherein the DMRS configuration information comprises a first mapping relationship, wherein the first mapping relationship indicates a correspondence between the position index of the last symbol occupied by the physical shared channel in the resource unit and a time domain position occupied by the additional DMRS in the resource unit.

23. The communication apparatus according to claim 21, wherein the DMRS configuration information comprises a second mapping relationship, wherein, the second mapping relationship indicates a correspondence between a quantity of symbols occupied by the physical shared channel in the resource unit and a time domain position occupied by the additional DMRS in the resource unit.

24. The communication apparatus according to claim 20, wherein the first indication information indicates the first type, and a time domain position of the first DMRS corresponds to a third symbol or a fourth symbol in a slot.

25. The communication apparatus according to claim 20, wherein the first indication information indicates the second type, and the operations comprise: indicating the terminal device of a time domain position of the first DMRS, and, the time domain position of the first DMRS is a first symbol occupied by the physical shared channel in a slot.

26. The communication apparatus according to claim 19, wherein the communication apparatus is a network device or a chip.

27. A non-transitory computer-readable medium, configured to store a computer program, wherein the computer program comprises one or more instructions implementing a resource indication method comprising:
  receiving first indication information from a network device, wherein the first indication information indicates a mapping type of a physical shared channel, wherein the mapping type of the physical shared channel is a first type or a second type, the first type comprises PDSCH mapping type A or PUSCH mapping type A, and the second type comprises PDSCH mapping type B or PUSCH mapping type B; and
  determining time domain positions occupied by demodulation reference signal (DMRS) in a resource unit based on the mapping type of the physical shared channel, wherein, under different mapping types, the time domain positions occupied by the DMRS in the resource unit are determined based on different parameters in a manner comprising:
    in response to that the mapping type of the physical shared channel is the first type, the time domain positions occupied by the DMRS in the resource unit are determined based on a position index of a last symbol occupied by the physical shared channel in the resource unit; and
    in response to that the mapping type of the physical shared channel is the second type, the time domain positions occupied by the DMRS in the resource unit are determined based on a quantity of symbols occupied by the physical shared channel in the resource unit.

28. The non-transitory computer-readable medium according to claim 27, wherein the DMRS comprises a first DMRS and an additional DMRS, and under different mapping types, the time domain positions occupied by DMRS in the resource unit are determined based on different parameters in a manner comprising:
  in response to that the mapping type of the physical shared channel is the first type, a time domain position occupied by the additional DMRS in the resource unit is determined based on the position index of the last symbol occupied by the physical shared channel in the resource unit; and
  in response to that the mapping type of the physical shared channel is the second type, the time domain position occupied by the additional DMRS in the resource unit is determined based on the quantity of symbols occupied by the physical shared channel in the resource unit.

29. The non-transitory computer-readable medium according to claim 28, wherein the mapping type of the physical shared channel is the first type; and
  the time domain position occupied by the additional DMRS in the resource unit is determined based on at least the position index of the last symbol occupied by the physical shared channel in the resource unit and a first mapping relationship, wherein the first mapping relationship indicates a correspondence between the position index of the last symbol of the physical shared channel in the resource unit and the time domain position occupied by the additional DMRS in the resource unit.

30. The non-transitory computer-readable medium according to claim 28, wherein the mapping type of the physical shared channel is the second type; and
  the time domain position occupied by the additional DMRS in the resource unit is determined based on at least the quantity of symbols occupied by the physical shared channel in the resource unit and a second mapping relationship, wherein the second mapping relationship indicates a correspondence between a quantity of symbols occupied by the physical shared channel in the resource unit and the time domain position occupied by the additional DMRS in the resource unit.

31. The non-transitory computer-readable medium according to claim 28, wherein the resource indication method further comprises:
  before the time domain position occupied by the additional DMRS in the resource unit is determined,
  receiving second indication information from the network device, wherein the second indication information indicates a quantity of additional DMRS; and
  receiving third indication information from the network device, wherein the third indication information indicates an actual quantity of symbols occupied by the first DMRS in the resource unit;
  wherein:
    in response to that the mapping type of the physical shared channel is the first type, the time domain position occupied by the additional DMRS in the resource unit is determined based on the quantity of additional DMRS, and the actual quantity of symbols occupied by the first DMRS in the resource unit and the position index of the last symbol occupied by the physical shared channel in the resource unit; and
    in response to that the mapping type of the physical shared channel is the second type, the time domain position occupied by the additional DMRS in the resource unit is determined based on the quantity of additional DMRS, and the actual quantity of symbols occupied by the first DMRS in the resource unit and the quantity of symbols occupied by the physical shared channel in the resource unit.

32. A non-transitory computer-readable medium, configured to store a computer program, wherein the computer program comprises one or more instructions implementing a method comprising:
  transmitting first indication information to a terminal device, wherein the first indication information indicates a mapping type of a physical shared channel, wherein the mapping type of the physical shared channel is a first type or a second type, the first type comprises PDSCH mapping type A or PUSCH mapping type A, and the second type comprises PDSCH mapping type B or PUSCH mapping type B;

determining time domain positions occupied by a demodulation reference signal (DMRS) in a resource unit based on the mapping type of the physical shared channel; and transmitting the DMRS to the terminal device according to the time domain positions, wherein:

under different mapping types, the time domain positions occupied by the DMRS in the resource unit are determined based on different parameters in a manner comprising:

in response to that the mapping type of the physical shared channel is the first type, the time domain positions occupied by the DMRS in the resource unit are determined based on a position index of a last symbol occupied by the physical shared channel in the resource unit; and in response to that the mapping type of the physical shared channel is the second type, the time domain positions occupied by the DMRS in the resource unit are determined based on a quantity of symbols occupied by the physical shared channel in the resource unit.

33. The non-transitory computer-readable medium according to claim 32, wherein the DMRS comprises a first DMRS and an additional DMRS, and the method further comprises:

transmitting second indication information to the terminal device, wherein the second indication information indicates a quantity of additional DMRS; and transmitting third indication information to the terminal device, wherein the third indication information indicates an actual quantity of symbols occupied by the first DMRS in the resource unit.

34. The non-transitory computer-readable medium according to claim 33, wherein the time domain positions occupied by the DMRS are determined according to DMRS configuration information, wherein the DMRS configuration information comprises a time domain position of the additional DMRS under a mapping type of the physical shared channel.

35. The non-transitory computer-readable medium according to claim 34, wherein the DMRS configuration information comprises a first mapping relationship, wherein the first mapping relationship indicates a correspondence between the position index of the last symbol occupied by the physical shared channel in the resource unit and a time domain position occupied by the additional DMRS in the resource unit.

36. The non-transitory computer-readable medium according to claim 34, wherein the DMRS configuration information comprises a second mapping relationship, wherein, the second mapping relationship indicates a correspondence between a quantity of symbols occupied by physical shared channel in the resource unit and a time domain position occupied by the additional DMRS in the resource unit.

37. The non-transitory computer-readable medium according to claim 33, wherein the first indication information indicates the first type, and a time domain position of the first DMRS corresponds to a third symbol or a fourth symbol in a slot.

38. The non-transitory computer-readable medium according to claim 33, wherein the first indication information indicates the second type, and the method further comprises:

indicating a time domain position of the first DMRS, wherein the time domain position of the first DMRS is a first symbol occupied by the physical shared channel in a slot.

* * * * *